US012229226B2

(12) United States Patent
Valdes et al.

(10) Patent No.: US 12,229,226 B2
(45) Date of Patent: Feb. 18, 2025

(54) SYSTEMS AND METHODS FOR GENERATING IMPROVED DECISION TREES

(71) Applicants: THE TRUSTEES OF THE UNIVERSITY OF PENNSYLVANIA, Philadelphia, PA (US); THE REGENTS OF THE UNIVERSITY OF CALIFORNIA, Oakland, CA (US)

(72) Inventors: Gilmer Valdes, Philadelphia, PA (US); Timothy D. Solberg, Philadelphia, PA (US); Charles B. Simone, II, Philadelphia, PA (US); Lyle H. Ungar, Philadelphia, PA (US); Eric Eaton, Havertown, PA (US); Jose Marcio Luna, Philadelphia, PA (US)

(73) Assignee: THE TRUSTEES OF THE UNIVERSITY OF PENNSYLVANIA, Philadelphia, PA (US)

(*) Notice: Subject to any disclaimer, the term of this patent is extended or adjusted under 35 U.S.C. 154(b) by 985 days.

(21) Appl. No.: 16/314,033

(22) PCT Filed: Jun. 30, 2017

(86) PCT No.: PCT/US2017/040353
§ 371 (c)(1),
(2) Date: Dec. 28, 2018

(87) PCT Pub. No.: WO2018/006004
PCT Pub. Date: Jan. 4, 2018

(65) Prior Publication Data
US 2023/0186106 A1    Jun. 15, 2023

Related U.S. Application Data

(60) Provisional application No. 62/357,250, filed on Jun. 30, 2016.

(51) Int. Cl.
*G06N 5/01* (2023.01)
*G06F 18/243* (2023.01)

(52) U.S. Cl.
CPC ........ *G06F 18/24323* (2023.01); *G06N 5/01* (2023.01)

(58) Field of Classification Search
CPC .......... G06N 20/00; G06N 5/01; G06N 20/20; G06N 7/01; G06N 20/10; G06N 3/045;
(Continued)

(56) References Cited

U.S. PATENT DOCUMENTS

2011/0307423 A1* 12/2011 Shotton .................. G06N 20/00
706/12
2014/0122381 A1   5/2014 Nowozin
(Continued)

OTHER PUBLICATIONS

International Search Report dated Sep. 8, 2017 for International Patent Application No. PCT/US2017/040353, 2 pp.
(Continued)

*Primary Examiner* — Luis A Sitiriche
(74) *Attorney, Agent, or Firm* — Morgan, Lewis & Bockius LLP

(57) ABSTRACT

A system and method for generating a decision tree having a plurality of nodes, arranged hierarchically as parent nodes and child nodes, comprising: generating a node including: receiving i) training data including data instances, each data instance having a plurality of attributes and a corresponding label, ii) instance weightings, iii) a valid domain for each attribute generated, and iv) an accumulated weighted sum of predictions for a branch of the decision tree; and associating one of a plurality of binary prediction of an attribute with each node including selecting the one of the plurality of binary predictions having a least amount of error; in accordance with a determination that the node includes child nodes, repeat the generating the node step for the child (Continued)

nodes; and in accordance with a determination that the node is a terminal node, associating the terminal node with an outcome classifier; and displaying the decision tree including the plurality of nodes arranged hierarchically.

6 Claims, 17 Drawing Sheets

(58) Field of Classification Search
CPC ............ G06N 5/04; G06N 3/08; G06N 3/084;
G06N 5/022; G06N 5/025; G06N 3/006;
G06N 3/044; G06N 3/088; G06N 5/045;
G06N 5/02; G06N 3/04; G06N 3/042;
G06N 3/047; G06N 3/02; G06N 7/023;
G06N 3/126; G06N 5/048; G06N 7/02;
G06N 3/004; G06N 99/00; G06N 3/048;
G06N 3/082; G06N 5/043; G06N 3/043;
G06N 3/049; G06N 5/041; G06N 5/046;
G06N 3/063; G06N 5/027; G06N 3/00;
G06N 3/09; G06N 5/00; G06N 10/00;
G06N 3/0475; G06N 3/06; G06N 3/086;
G06N 3/105; G06N 3/123; G06N 5/047;
G06N 7/00

See application file for complete search history.

(56) References Cited

U.S. PATENT DOCUMENTS

| | | |
|---|---|---|
| 2014/0180978 A1 | 6/2014 | Martinez et al. |
| 2015/0379426 A1 | 12/2015 | Steele |
| 2016/0203281 A1* | 7/2016 | Zalis .................. G16H 70/20 |
| | | 705/3 |

OTHER PUBLICATIONS

Written Opinion dated Sep. 8, 2017 for International Patent Application No. PCT/US2017/040353, 4 pp.

* cited by examiner

Algorithm 2 MediBoost($X, y, w_t, LR, \lambda, \mathfrak{D}, T, F_t$)
Inputs:
- training data $X = \{x_1, \ldots, x_n\}$ with corresponding labels $y = \{y_1, \ldots, y_n\}$, where $x_j \in \mathcal{X}$ for some $d$-dimensional feature space $\mathcal{X}$, and $y_j \in \{-1, +1\}$
- instance weights $w_t \in \mathbb{R}^n$, which defaults to a uniform distribution initially
- learning rate $LR \in (0, 1]$
- regularization constant $\lambda \in (0, +\infty)$
- valid domain of each attribute $\mathfrak{D} = \{\mathfrak{D}_1, \ldots, \mathfrak{D}_d\}$ (for continuous attributes, $\mathfrak{D}_j$ is a valid interval; for discrete or categorical attributes, $\mathfrak{D}_j$ is a set of valid values)
- number of remaining boosting iterations $T$
- accumulated weighted sum of predictions $F_t$, which defaults to 0 initially

Outputs:
- the root node of a decision tree

1: Create a root node $N_t$ for the subtree
2: If $T = 0$, Return the single-node subtree $N_t$ with label sign($F_t$)
3: Fit weak classified $h_t(x, a_t) : \mathcal{X} \mapsto \{-1, +1\}$ by finding the stump with decision rule $a_t$ on attribute *attr* that minimizes the weighted least square error on the pseudo response $\left(X, \frac{\partial \ell(y, F(x))}{\partial F(x)}\right)$ with observation weights $w_t(i) = M(x_j, t-1)$ by solving $$\{a_t, \beta_t\} \leftarrow \arg\min_{a,\beta} \sum_{i=1}^{N} w_t(i) \left[\frac{\partial \ell(y_j, F(x_j))}{\partial F(x_j)} - \beta h(x_j, a))\right]^2$$

4: Update the node weights for the left (-) and right (+) subtrees:
$c_- \leftarrow -\frac{LR \cdot G_-}{K_- + \lambda}$, $c_+ \leftarrow -\frac{LR \cdot G_+}{K_+ + \lambda}$ 5: Let $\mathfrak{D}(a_t)$ represent the domain of attribute *attr* when $a_t$ is true, and $\mathfrak{D}^C(a_t)$ its complement
6: Compute valid domains for all attributes for the left (-) and right (+) subtrees:
   a. Let $\mathfrak{D}_{\overline{attr}} \leftarrow \mathfrak{D}_{attr} \cap \mathfrak{D}^C(a_t)$ and $\mathfrak{D}^- \leftarrow \{\mathfrak{D}_1, \ldots, \mathfrak{D}_{attr-1}, \mathfrak{D}_{\overline{attr}}, \mathfrak{D}_{attr+1}, \ldots, \mathfrak{D}_d\}$
   b. Let $\mathfrak{D}_{\overline{attr}}^+ \leftarrow \mathfrak{D}_{attr} \cap \mathfrak{D}(a_t)$ and $\mathfrak{D}^+ \leftarrow \{\mathfrak{D}_1, \ldots, \mathfrak{D}_{attr-1}, \mathfrak{D}_{\overline{attr}}^+, \mathfrak{D}_{attr+1}, \ldots, \mathfrak{D}_d\}$ 7: Update the instance weights for the left (-) and right (+) subtrees:
   a. $w^-_{t+1}(i) \leftarrow M(x_j, t) \forall x_j \in X$
   b. $w^+_{t+1}(i) \leftarrow M(x_j, t) \forall x_j \in X$ 8: If $\mathfrak{D}_a^- \neq \emptyset$, compute the left subtree recursively:

$$N_t.left \leftarrow \text{MediBoost}(X, y, LR, \lambda, w^-_{t+1}, \mathfrak{D}^-, T-1, F_t - \beta_t)$$

9: If $\mathfrak{D}_a^+ \neq \emptyset$, compute the right subtree recursively:

$$N_t.right \leftarrow \text{MediBoost}(X, y, LR, \lambda, w^+_{t+1}, \mathfrak{D}^+, T-1, F_t + \beta_t)$$

10: If $\mathfrak{D}_a^- = \emptyset$, Return $N_t.right$
    Else If $\mathfrak{D}_a^+ = \emptyset$, Return $N_t.left$
    Else Return $N_t$

Fig. 3

Example Interpretable Rules Induced by MediBoost:
A3 Uniformity of Cell Shape ≤ 1.0 ∧ A2 Uniformity of Cell Size > 3.0 ∧ A7 Bland Chromatin ≤ 3.0 ⇒ predict benign
A3 Uniformity of Cell Shape > 1.0 ∧ A6 Bare Nuclei ≤ 1.0 ∧ A2 Uniformity of Cell Size > 3.0 ⇒ predict malignant

Algorithm 1 MediAdaBoost($X, y, w_t, \mathfrak{D}, T, F_t$)
Inputs:
- training data $X = \{x_1, \ldots, x_n\}$ with corresponding labels $y = \{y_1, \ldots, y_n\}$, where $x_j \in \mathcal{X}$ for some $d$-dimensional feature space $\mathcal{X}$, and $y_j \in \{-1, +1\}$
- instance weights $w_t \in \mathbb{R}^n$, which defaults to a uniform distribution initially
- valid domain of each attribute $\mathfrak{D} = \{\mathfrak{D}_1, \ldots, \mathfrak{D}_d\}$ (for continuous attributes, $\mathfrak{D}_j$ is a valid interval; for discrete or categorical attributes, $\mathfrak{D}_j$ is a set of valid values)
- number of remaining boosting iterations $T$
- accumulated weighted sum of predictions $F_t$, which defaults to 0 initially

Outputs:
- the root node of a decision tree

1: Create a root node $N_t$ for the subtree

2: If $T = 0$, Return the single-node subtree $N_t$ with label $\text{sign}(F_t)$ 3: Fit weak classifier $h_t(x, a_t) : \mathcal{X} \mapsto \{-1, +1\}$ by finding the stump with decision rule $a_t$ on attribute $attr$ that minimizes the weighted least square error on $(X, y)$ with weights $w_t$ 4: Calculate the error of the node as $err_t \leftarrow \sum_i w_t(i) \mathbb{1}(y_i \neq h_t(x_i, a_t))$.

5: Set $\beta_t \leftarrow \frac{1}{2} \log\left(\frac{1 - err_t}{err_t}\right)$ 6: Update the instance weights for the left (-) and right (+) subtrees:
  a. $w_{t+1}^-(i) \leftarrow \frac{1}{Z_t^-} w_t(i) \exp\left(-\beta_t y_i h_t(x_i, a_t) - A\mathbb{1}(h_t(x_i, a_t) = +1)\right) \ \forall x_i \in X$
  b. $w_{t+1}^+(i) \leftarrow \frac{1}{Z_t^+} w_t(i) \exp\left(-\beta_t y_i h_t(x_i, a_t) - A\mathbb{1}(h_t(x_i, a_t) = -1)\right) \ \forall x_i \in X$,
  where $Z_t^-$ and $Z_t^+$ normalize $w_{t+1}^-$ and $w_{t+1}^+$ respectively to be distributions, and the acceleration constant $A$ penalizes instances where $h_t(x, a_t)$ disagrees with the branch.

7: Let $\mathfrak{D}(a_t)$ represent the domain of attribute $attr$ when $a_t$ is true, and $\mathfrak{D}^C(a_t)$ its complement 8: Compute valid domains for all attributes for the left (-) and right (+) subtrees:
  a. Let $\mathfrak{D}_{attr}^- \leftarrow \mathfrak{D}_{attr} \cap \mathfrak{D}^C(a_t)$ and $\mathfrak{D}^- \leftarrow \{\mathfrak{D}_1, \ldots, \mathfrak{D}_{attr-1}, \mathfrak{D}_{attr}^-, \mathfrak{D}_{attr+1}, \ldots, \mathfrak{D}_d\}$
  b. Let $\mathfrak{D}_{attr}^+ \leftarrow \mathfrak{D}_{attr} \cap \mathfrak{D}(a_t)$ and $\mathfrak{D}^+ \leftarrow \{\mathfrak{D}_1, \ldots, \mathfrak{D}_{attr-1}, \mathfrak{D}_{attr}^+, \mathfrak{D}_{attr+1}, \ldots, \mathfrak{D}_d\}$ 9: If $\mathfrak{D}_{attr}^- \neq \emptyset$, compute the left subtree recursively:
$$N_t.left \leftarrow \text{MediAdaBoost}(X, y, w_{t+1}^-, \mathfrak{D}^-, T-1, F_t - \beta_t)$$

10: If $\mathfrak{D}_{attr}^+ \neq \emptyset$, compute the right subtree recursively:
$$N_t.right \leftarrow \text{MediAdaBoost}(X, y, w_{t+1}^+, \mathfrak{D}^+, T-1, F_t + \beta_t)$$

11: If $\mathfrak{D}_{attr}^- = \emptyset$, Return $N_t.right$
  Else If $\mathfrak{D}_{attr}^+ = \emptyset$, Return $N_t.left$
  Else Return $N_t$

Fig. 5

---
Algorithm 3 LikelihoodMediBoost($X, y, w_t, LR, \lambda, \mathfrak{D}, T, F_t$)
Inputs:
- training data $X = \{x_1,\ldots,x_n\}$ with corresponding labels $y = \{y_1,\ldots,y_n\}$, where $x_i \in \mathcal{X}$ for some $d$-dimensional feature space $\mathcal{X}$, and $y_j \in \{-1,+1\}$
- instance weights $w_t \in \mathbb{R}^n$, which defaults to a uniform distribution initially
- learning rate $LR \in (0, 1]$
- regularization constant $\lambda \in (0, +\infty)$
- valid domain of each attribute $\mathfrak{D} = \{\mathfrak{D}_1,\ldots,\mathfrak{D}_d\}$ (for continuous attributes, $\mathfrak{D}_j$ is a valid interval; for discrete or categorical attributes, $\mathfrak{D}_j$ is a set of valid values)
- number of remaining boosting iterations $T$
- accumulated weighted sum of predictions $F_t$, which defaults to 0 initially

Outputs:
- the root node of a decision tree
---
1: Create a root node $N_t$ for the subtree
2: If $T = 0$, Return the single-node subtree $N_t$ with label sign $(F_t)$
3: Fit weak classifier $h_t(x, a_t) : \mathcal{X} \mapsto \{-1, +1\}$ by finding the stump with decision rule $a_t$ on attribute $attr$ that minimizes the weighted least square error on the pseudo response $\left(X, \frac{\partial \ell(y, F(x))}{\partial F(x)}\right)$ with observation weights $w_t$ by solving
$$\{a_t, \beta_t\} \leftarrow \arg\min_{a,\beta} \sum_{i=1}^N w_t(i) \left[\frac{-2y_i}{(1+e^{2y_i F(x_i)})} - \beta_T h(x_i, a)\right]^2$$
4: Update the node weights for the left (-) and right (+) subtrees:
$$c_- \leftarrow -\frac{LR \cdot G_-}{K_- + \lambda}, \quad c_+ \leftarrow -\frac{LR \cdot G_+}{K_+ + \lambda}$$
5: Let $\mathfrak{D}(a_t)$ represent the domain of attribute $attr$ when $a_t$ is true, and $\mathfrak{D}^c(a_t)$ its complement
6: Compute valid domains for all attributes for the left (-) and right (+) subtrees:
  a. Let $\mathfrak{D}^-_{attr} \leftarrow \mathfrak{D}_{attr} \cap \mathfrak{D}^c(a_t)$ and $\mathfrak{D}^- \leftarrow \{\mathfrak{D}_1,\ldots,\mathfrak{D}_{attr-1}, \mathfrak{D}^-_{attr}, \mathfrak{D}_{attr+1},\ldots,\mathfrak{D}_d\}$
  b. Let $\mathfrak{D}^+_{attr} \leftarrow \mathfrak{D}_{attr} \cap \mathfrak{D}(a_t)$ and $\mathfrak{D}^+ \leftarrow \{\mathfrak{D}_1,\ldots,\mathfrak{D}_{attr-1}, \mathfrak{D}^+_{attr}, \mathfrak{D}_{attr+1},\ldots,\mathfrak{D}_d\}$
7: Update the instance weights for the left (-) and right(+) subtrees:
  a. $w^-_{t+1}(i) \leftarrow \frac{1}{Z^-_t} w_t(i) \exp\left(A\left(d(h_t(x, a_t)) - 1\right)\right) . \forall x_i \in X$
     Where $\frac{1}{Z^-_t} = (\exp(A(d(h_t(x, a_t)) - 1)) + \exp(-Ad(h_t(x, a_t))))$
  b. $w^+_{t+1}(i) \leftarrow \frac{1}{Z^+_t} w_t(i) \exp\left(A\left(d(h_t(x, a_t)) - 1\right)\right) . \forall x_i \in X$
     Where $\frac{1}{Z^+_t} = (\exp(A(d(h_t(x, a_t)) - 1)) + \exp(-Ad(h_t(x, a_t))))$
8: If $\mathfrak{D}^-_a \neq \emptyset$, compute the left subtree recursively:
   $N_t.left \leftarrow$ LikelihoodMediBoost$(X, y, LR, \lambda, w^-_{t+1}, \mathfrak{D}^-, T-1, F_t - \beta_t)$
9: If $\mathfrak{D}^+_a \neq \emptyset$, compute the right subtree recursively:
   $N_t.right \leftarrow$ LikelihoodMediBoost$(X, y, LR, \lambda, w^+_{t+1}, \mathfrak{D}^+, T-1, F_t + \beta_t)$
10: If $\mathfrak{D}^-_a \neq \emptyset$, Return $N_t.right$
    Else If $\mathfrak{D}^+_a \neq \emptyset$, Return $N_t.left$
    Else Return $N_t$
---

Fig. 6

LMB vs decision trees

LMB vs ensemble methods

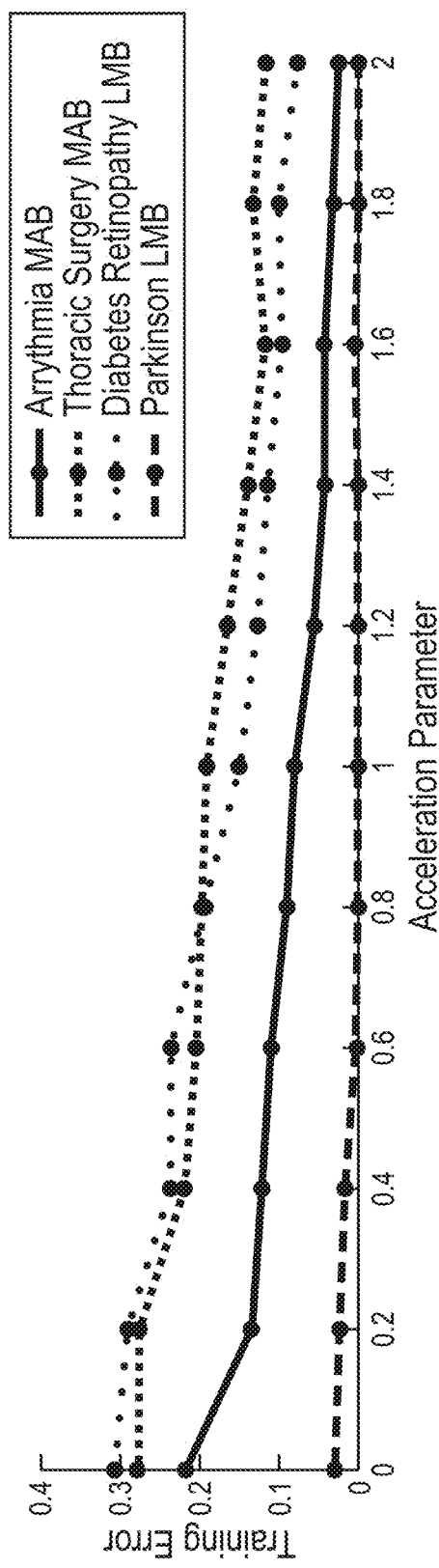
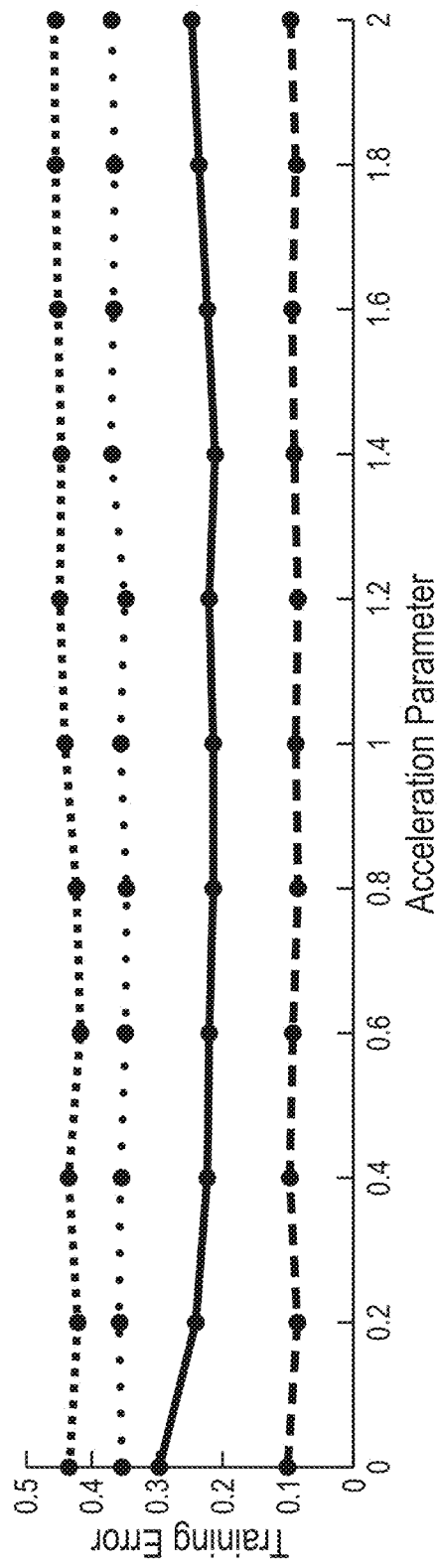
Fig. 9A
Fig. 9B

Lemma 1 *The weight of $x_j$ at leaf $l \in \{1,\ldots,2^n\}$ at the $n^{th}$ boosting iteration is given by*

$$w_{n,l}(x_j) = \frac{w_0(x_j)(\lambda+1)^{\sum_{k=1}^{n}\mathbb{1}[x_j \in R_k]} \lambda^{\sum_{k=1}^{n}\mathbb{1}[x_j \in R_k^C]}}{\prod_{k=1}^{n} z_k} \quad \forall n = 1, 2, \ldots, \qquad (6)$$

where $\{R_1, \ldots, R_n\}$ is the sequence of partitions along the path from the root to $l$.

Proof by Induction *For the base case $n = 1$, the update rule (5) states that*

$$w_{1,l}(x_j) = \frac{w_0(x_j)}{z_1}\left(\lambda + \mathbb{1}[x_j \in R_1]\right) = \frac{w_0(x_j)(\lambda+1)^{\mathbb{1}[x_j \in R_1]}\lambda^{\mathbb{1}[x_j \in R_1^C]}}{z_1} \text{ for } R_1 \in \{P_{1,1}, P_{1,1}^C\},$$

*showing that (6) holds for $n = 1$. We assume that (6) is true for some $n \geq 1$ and show that for $n + 1$,*

$$w_{n,l}(x_j)\left(\frac{(\lambda+1)^{\mathbb{1}[x_j \in R_{n+1}]}\lambda^{\mathbb{1}[x_j \in R_{n+1}^C]}}{z_{n+1}}\right) = \frac{w_0(x_j)(\lambda+1)^{\sum_{k=1}^{n+1}\mathbb{1}[x_j \in R_n]}\lambda^{\sum_{k=1}^{n+1}\mathbb{1}[x_j \in R_k^C]}}{\prod_{m=1}^{n+1} z_m}$$

$$= w_{n+1,l}(x_j),$$

*thereby showing that (6) holds for $n + 1$ and, by induction, completing the proof.*

Fig. 14A

Lemma 2 *Given the weight distribution formula (6) of $x_j$ at leaf $l \in \{1, ..., 2^m\}$ at the $n^{th}$ boosting iteration, the following limits hold,*

$$\lim_{\lambda \to 0} w_{n,l}(x_j) = \frac{w_0(x_j)}{\sum_{x_j \in \mathcal{R}_{n,l}} w_0(x_j)} \mathbb{1}[x_j \in \mathcal{R}_{n,l}], \tag{7}$$

$$\lim_{\lambda \to \infty} w_{n,l}(x_j) = w_0(x_j) \tag{8}$$

where $\mathcal{R}_{n,l} = \bigcap_{k=1}^{n} R_k$ is the intersection of the partitions along the path from the root to $l$.

Proof In order to prove (7), we observe that, $$\lim_{\lambda \to 0} \lambda^{\sum_{k=1}^{n} \mathbb{1}[x_j \in R_k^C]} = \begin{cases} 1 & \text{if } \sum_{k=1}^{n} \mathbb{1}[x_j \in R_k^C] = 0 \\ 0 & \text{otherwise} \end{cases}$$

Moreover, $$\sum_{k=1}^{n} \mathbb{1}[x_j \in R_k^C] = 0 \iff x_j \in \bigcap_{k=1}^{n} R_k = \mathcal{R}_{n,l},$$

therefore, $$\lim_{\lambda \to 0} \lambda^{\sum_{k=1}^{n} \mathbb{1}[x_j \in R_k^C]} = \mathbb{1}[x_j \in \mathcal{R}_{n,l}]$$

Calculating the limits as $\lambda \to 0$, $$\lim_{\lambda \to 0} w_{n,l}(x_j) = \lim_{\lambda \to 0} \frac{w_0(x_j)(\lambda+1)^{\sum_{k=1}^{n} \mathbb{1}[x_j \in R_k]} \lambda^{\sum_{k=1}^{n+1} \mathbb{1}[x_j \in R_k^C]}}{\prod_{m=1}^{n} z_m}$$

$$= \frac{w_0(x_j) \lim_{\lambda \to 0} \lambda^{\sum_{k=1}^{n+1} \mathbb{1}[x_j \in R_k^C]}}{\prod_{m=1}^{n} z_m}$$

$$= \frac{w_0(x_j)}{\prod_{m=1}^{n} z_m} \mathbb{1}[x_j \in \mathcal{R}_{n,l}],$$

which is equal to (7), since $\prod_{m=1}^{n} z_m = \sum_{x_j \in \mathcal{R}_{n,l}} w_0(x_j)$.

Calculating the limit as $\lambda \to \infty$ of (6) notice that, $$\prod_{m=1}^{n} z_m = \sum_{j=1}^{N} w_0(x_j)(\lambda+1)^{\sum_{k=1}^{n} \mathbb{1}[x_j \in R_k]} \lambda^{\sum_{k=1}^{n} \mathbb{1}[x_j \in R_k^C]}$$

and $$\sum_{k=1}^{n} \mathbb{1}[x_j \in R_k] + \sum_{k=1}^{n} \mathbb{1}[x_j \in R_k^C] = n,$$

therefore, $$\lim_{\lambda \to \infty} w_{n,l}(x_j) = \lim_{\lambda \to \infty} \frac{w_0(x_j)(\lambda+1)^{\sum_{k=1}^{n} \mathbb{1}[x_j \in R_k]} \lambda^{\sum_{k=1}^{n} \mathbb{1}[x_j \in R_k^C]}}{\sum_{j=1}^{N} w_0(x_j)(\lambda+1)^{\sum_{k=1}^{n} \mathbb{1}[x_j \in R_k]} \lambda^{\sum_{k=1}^{n} \mathbb{1}[x_j \in R_k^C]}}$$

$$= \lim_{\lambda \to \infty} \frac{w_0(x_j) \lambda^{\sum_{k=1}^{n} \mathbb{1}[x_j \in R_k]} \lambda^{\sum_{k=1}^{n} \mathbb{1}[x_j \in R_k^C]}}{\sum_{j=1}^{N} w_0(x_j) \lambda^{\sum_{k=1}^{n} \mathbb{1}[x_j \in R_k]} \lambda^{\sum_{k=1}^{n} \mathbb{1}[x_j \in R_k^C]}}$$

$$= \frac{\lambda^n w_0(x_j)}{\lambda^n \sum_{j=1}^{N} w_0(x_j)}$$

$$= \frac{w_0(x_j)}{\sum_{j=1}^{N} w_0(x_j)}$$

$$= w_0(x_j),$$

since $\sum_{j=1}^{N} w_0(x_j) = 1$.

Fig. 14B

Lemma 3 *The optimal simple regressor $h_{n,l}^*(x)$ that minimizes the loss function (3) at the $n^{th}$ iteration at node $l \in \{1,\ldots,2^n\}$ is given by,*

$$h_{n,l}^*(x) = \begin{cases} \dfrac{\sum_{i:x_i \in R_n} w_{n,l}(x_i)(y_i - F_{n-1}(x_i))}{\sum_{i:x_i \in R_n} w_{n,l}(x_i)} & \text{if } x_i \in R_n \\ \dfrac{\sum_{i:x_i \in R_n^C} w_{n,l}(x_i)(y_i - F_{n-1}(x_i))}{\sum_{i:x_i \in R_n^C} w_{n,l}(x_i)} & \text{otherwise} \end{cases} \quad (9)$$

Proof *For a given region $R_n \subset \mathcal{X}$ at the $n^{th}$ boosting iteration, the simple regressor has the form*

$$h_n(x) = \begin{cases} h_{n_1} & \text{if } x \in R_n \\ h_{n_2} & \text{otherwise} \end{cases}, \quad (10)$$

*with constants $h_{n_1}, h_{n_2} \in \mathbb{R}$. Splitting (3) into the regions $R_n$ and $R_n^C$, we obtain*

$$L(y, F_{n-1}(x) + h(x)) = \sum_{i:x_i \in R_n} \frac{w_{n,l}(x_i)}{z}(y_i - F_{n-1}(x_i) - h_{n_1})^2$$
$$+ \sum_{i:x_i \in R_n^C} \frac{w_{n,l}(x_i)}{z}(y_i - F_{n-1}(x_i) - h_{n_2})^2.$$

*Case $x_i \in R_n$:*
*We calculate the derivative of $L(y, F_{n-1}(x) + h(x))$ with respect to $h_{n_1}$, obtaining*

$$\frac{\partial L(y, F_{n-1}(x) + h(x))}{\partial h(x)} = -2 \sum_{i:x_i \in R_n} \frac{w_{n,l}(x_i)}{z}(y_i - F_{n-1}(x_i) - h_{n_1}).$$

*It is easy to see that $\dfrac{\partial^2 L(y, F_{n-1}(x) + h(x))}{\partial h(x)^2} > 0$, therefore, a global minimum exists. Setting the above derivative to zero and rearranging the summations yields*

$$h_{n_1}^* = \frac{\sum_{i:x_i \in R_n} w_{n,l}(x_i)(y_i - F_{n-1}(x_i))}{\sum_{i:x_i \in R_n} w_{n,l}(x_i)}, \quad \forall x_i \in R_n.$$

*Case $x_i \in R_n^C$:*
*Differentiating with respoect to $h_{n_2}$, we obtain*

$$\frac{\partial L(y, F_{n-1}(x) + h(x))}{\partial h(x)} = -2 \sum_{i:x_i \in R_n^C} \frac{w_{n,l}(x_i)}{z}(y_i - F_{n-1}(x_i) - h_{n_2}).$$

*Setting this derivative to zero and solving for $h_{n,l}(x)$ yields*

$$h_{n_2}^* = \frac{\sum_{i:x_i \in R_n^C} w_{n,l}(x_i)(y_i - F_{n-1}(x_i))}{\sum_{i:x_i \in R_n^C} w_{n,l}(x_i)}, \quad \forall x_i \in R_n^C.$$

Fig. 14C

Lemma 4 *The TSB update rule is given by $F_n(x) = F_{n-1}(x) + h_{n,l}(x)$. If $h_{n,l}(x)$ is defined as,*

$$h_{n,l}(x) = \frac{\sum_{i:x_i \in \mathcal{R}_{n,l}} w_{n,l}(x_i)(y_i - F_{n-1}(x_i))}{\sum_{i:x_i \in \mathcal{R}_{n,l}} w_{n,l}(x_i)},$$

*with constant $F_0(x) = \bar{y}_0$, then $F_n(x) = \bar{y}_n$ is constant, with*

$$\bar{y}_n = \frac{\sum_{i:x_i \in \mathcal{R}_{n,l}} w_{n,l}(x_i) y_i}{\sum_{i:x_i \in \mathcal{R}_{n,l}} w_{n,l}(x_i)}, \quad \forall n = 1, 2, \ldots. \qquad (11)$$

*Proof by Induction* *For the base case $n = 1$, we have*

$$h_1(x) = \frac{\sum_{i:x_i \in \mathcal{R}_{n,l}} w_{n,l}(x_i)(y_i - \bar{y}_0)}{\sum_{i:x_i \in \mathcal{R}_{n,l}} w_{n,l}(x_i)},$$

$$= \bar{y}_1 - \bar{y}_0.$$

*By definition, we know that $\mathcal{R}_{n,l} \subseteq R_{n,l}$, so $x_i \in \mathcal{R}_{n,l} \Rightarrow x_i \in R_n$. From (10) we have that $x_i \in R_n \Rightarrow h_1(x_i)$ is constant, and so $\bar{y}_1$ is constant. Therefore,*

$$F_1(x) = F_0(x) + \bar{y}_1 - \bar{y}_0 \Rightarrow F_1 = \bar{y}_1,$$

*and the base case has been shown to hold.*

*Assuming $F_n(x) = \bar{y}_n$ with $\bar{y}_n$ given by (11) for some $n \in \{1, 2, \ldots\}$, for $n + 1$ we obtain*

$$h_{n+1}(x) = \frac{\sum_{i:x_i \in \mathcal{R}_{n+1,l}} w_{n+1}^l(y_i - F_n(x_i))}{\sum_{i:x_i \in \mathcal{R}_{n+1,l}} w_{n+1}^l},$$

$$= \bar{y}_{n+1} - \bar{y}_n.$$

*By definition, we know that $\mathcal{R}_{n+1,l} \subseteq R_{n+1,l}$, and so $x_i \in \mathcal{R}_{n+1,l} \Rightarrow x_i \in R_{n+1,l}$. From (10) we have that $x_i \in R_{n+1,l} \Rightarrow h_{n+1}(x_i)$ is constant, and so $\bar{y}_{n+1}$ is constant. Therefore,*

$$F_{n+1}(x) = F_n(x) + h_{n+1}(x)$$

$$= \bar{y}_n + \bar{y}_{n+1} - \bar{y}_n$$

$$= \bar{y}_{n+1},$$

*completing the induction.*

Fig. 14D

SYSTEMS AND METHODS FOR GENERATING IMPROVED DECISION TREES

CROSS-REFERENCE TO RELATED APPLICATION

This application is a U.S. National Stage filing of International Patent Application No. PCT/US2017/040353 filed Jun. 30, 2017, which claims the benefit of priority to U.S. Provisional Patent Application No. 62/357,250 filed Jun. 30, 2016, the entirety of each is incorporated herein by reference.

BACKGROUND

The present invention generally relates to generating decision trees and, more particularly, to systems and methods for generating improved decision trees.

SUMMARY

In one embodiment there is a method for generating a decision tree having a plurality of nodes, arranged hierarchically as parent nodes and child nodes, comprising: generating a node of the decision tree, including: receiving i) training data including data instances, each data instance having a plurality of attributes and a corresponding label, ii) instance weightings, iii) a valid domain for each attribute generated, and iv) an accumulated weighted sum of predictions for a branch of the decision tree; and associating one of a plurality of binary prediction of an attribute with each node including selecting the one of the plurality of binary predictions having a least amount of weighted error for the valid domain, the weighted error being based on the instance weightings and the accumulated weighted sum of predictions for the branch of the decision tree associated with the node; in accordance with a determination that the node includes child nodes, repeat the generating the node step for the child nodes; and in accordance with a determination that the node is a terminal node, associating the terminal node with an outcome classifier; and displaying the decision tree including the plurality of nodes arranged hierarchically.

In some embodiments, generating the node includes: foregoing generating the node that has a binary prediction that is inconsistent with a parent node.

In some embodiments, generating the node includes: updating instance weightings for child nodes including incorporating an acceleration term to reduce consideration for data instances having labels that are inconsistent with the tree branch and utilizing the instance weightings during the generating the node step repeated for the child nodes.

In some embodiments, generating the node includes: updating the valid domain and utilizing the valid domain during generation of the child nodes.

In some embodiments, generating the node includes: foregoing generating the node that has a sibling node with an identical prediction.

In one embodiment, there is a system for generating a decision tree having a plurality of nodes, arranged hierarchically as parent nodes and child nodes, comprising: one or more memory units each operable to store at least one program; and at least one processor communicatively coupled to the one or more memory units, in which the at least one program, when executed by the at least one processor, causes the at least one processor to perform the steps of any of the preceding embodiments.

In one embodiment, there is a non-transitory computer readable storage medium having stored thereon computer-executable instructions which, when executed by a processor, perform the steps of any of the preceding embodiments.

BRIEF DESCRIPTION OF THE SEVERAL VIEWS OF THE DRAWINGS

The foregoing summary, as well as the following detailed description of embodiments of the invention, will be better understood when read in conjunction with the appended drawings of an exemplary embodiment. It should be understood, however, that the invention is not limited to the precise arrangements and instrumentalities shown.

In the Drawings:

FIG. 3 illustrates a method for generating a decision tree having a plurality of nodes, arranged hierarchically as parent nodes and child nodes, according to at least one embodiment of the invention.

FIG. 5 illustrates a method for generating a decision tree having a plurality of nodes, arranged hierarchically as parent nodes and child nodes, according to at least one embodiment of the invention.

FIG. 6 illustrates a method for generating a decision tree having a plurality of nodes, arranged hierarchically as parent nodes and child nodes, according to at least one embodiment of the invention.

FIGS. 9A-9B illustrates a graphical example of the effects of acceleration parameter on the training error (e.g., FIG. 9A) and testing error (e.g., FIG. 9B).

FIGS. 14A-14D illustrate full proofs of the lemmas used to prove the main result in Theorem 1, according to at least one embodiment of the invention.

DETAILED DESCRIPTION

Figure 1A:
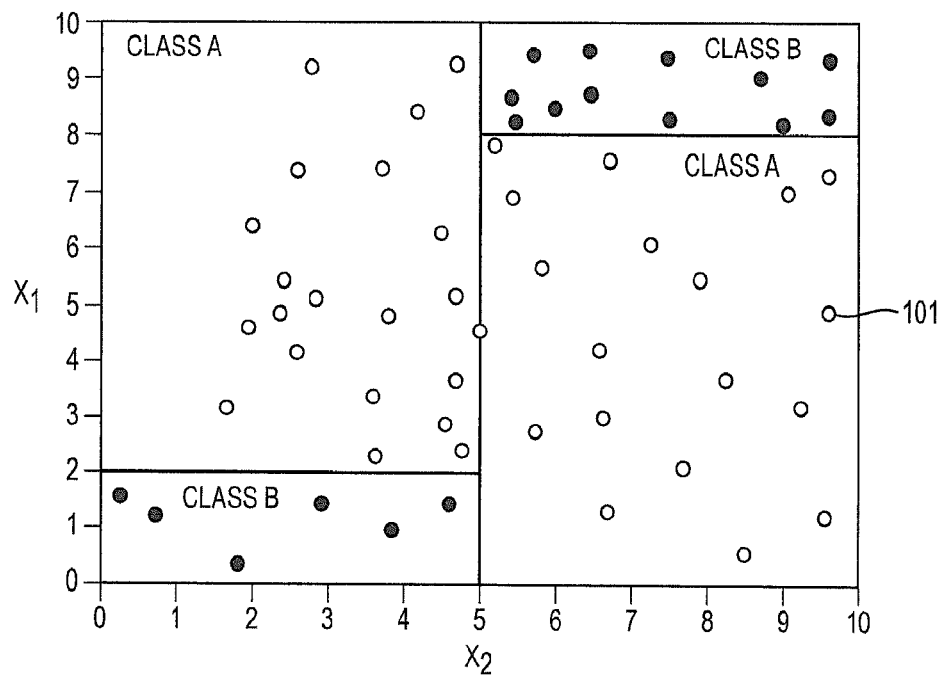
FIG. 1A illustrates an exemplary data set plotted on a Cartesian graph.

Referring to the drawings in detail, wherein like reference numerals indicate like elements throughout, there is shown in the Figures, generally designated, in accordance with an exemplary embodiment of the present invention.

Machine Learning has evolved dramatically in recent years, and now is being applied to a broad spectrum of problems from computer vision to medicine. Specifically in medicine, a query of "machine learning" on www.pubmed.gov returns approximately 10,000 articles. The transition to the clinic, however, has seen limited success, and there has been little dissemination into clinical practice. Machine learning algorithms generally have some degree of inaccuracy, which leaves a user (e.g., a physician) with the question of what to do when their intuition and experience disagree with an algorithm's prediction. Most users might ignore the algorithm, in these cases, without being able to interpret how the algorithm computed its result. For this reason, some of the most widely used machine-learning based scoring or classification systems are highly interpretable. However, these systems generally trade off interpretability for accuracy. In medicine and other fields where misclassification has a high cost, while average prediction accuracy is a desirable trait; interpretability is as well. This is the reason why decision trees such as C4.5, ID3, and CART are popular in medicine. They can simulate the way physicians think by finding subpopulations of patients that all comply with certain rules and have the same classification. In a decision tree, these rules may be represented by nodes organized in a hierarchy, leading to a prediction.

Figure 1B:
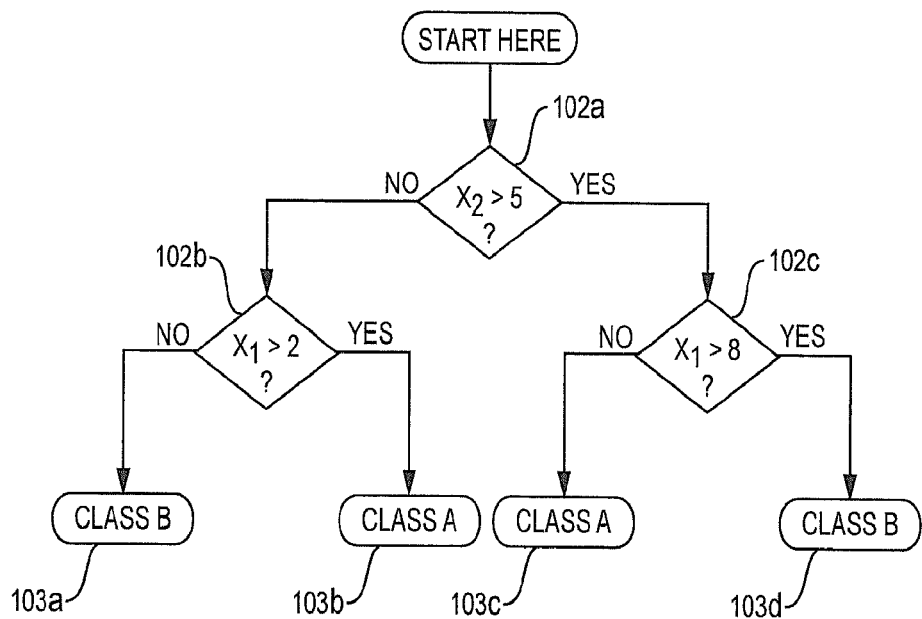
FIG. 1B illustrates an exemplary decision tree generated based on the exemplary data set of FIG. 1A.

FIG. 1A illustrates an exemplary data set plotted on a Cartesian graph. FIG. 1B illustrates an exemplary decision tree generated based on the exemplary data set of FIG. 1A. In FIG. 1A, data instances (e.g., data instance 101) in the data set are classified as either "Class A" or "Class B." In FIG. 1B, a decision tree is generated by generating three decision nodes 102a-102c to partition the data instances into four subregions 103a-103d. Following the decision tree, a user can determine the proper classification for a data instance in a data set. Using the data instance 101 as an example, a user would first determine whether data instance 101 has an $X_2$ value greater than 5. After determining that the $X_2$ value for the data instance 101 exceeds 5 (because the $X_2$ value is 9.5), the user would determine whether the data instance 101 has an $X_1$ value less than 8. After determining that the $X_1$ value for data instance 101 is less than 8 (because the $X_1$ value is 5), the user would classify the data instance 101 as "Class A."

The interpretability of decision trees can allow users to understand why a prediction is being made, providing an account of the reasons behind the prediction in case they want to override it. This interaction between users and algorithms can provide more accurate and reliable determinations (e.g., diagnoses) than either method alone, but it offers a challenge to machine learning: a tradeoff between accuracy and interpretability. Decision trees, although interpretable, are generally not among the most accurate algorithms. Instead, decision trees are generally outperformed by ensemble methods (the combination of multiple models) such as AdaBoost, Gradient boosting, and Random forests. Random forests in particular are widely used in medicine for their predictive power, although they can lack interpretability. In some embodiments described herein, there are systems and methods for generating decision trees that can have similar accuracy to ensemble methods while still being interpretable by users. In some embodiments, the systems and methods described herein are applicable in the field of medicine. However, it is contemplated that these systems and methods can be applicable to other fields besides medicine.

In some embodiments, ensemble methods, such as Ada-Boost, combine weak learners (i.e., classifiers whose prediction may be only required to be slightly better than random guessing) via a weighted sum to produce a strong classifier. These ensemble methods may receive, as input, a set of labeled data $X=\{x_1, \ldots, x_N\}$ with corresponding binary labels $y=\{y_1, \ldots, y_N\}$ such that $y_i \in \{-1, +1\}$. Each instance $x_i \in X$ lies in some d-dimensional feature space X, which may include a mix of real-valued, discrete, or categorical attributes. In these embodiments, the labels are given according to some "true" function $F^*: X = \rightarrow \{-1, +1\}$, with the goal being to obtain an approximation F of that true function from the labeled training data under some loss function $L(y, F(x))$.

When evaluating different processes, a notion of interpretability that is common in the medical community is used that considers a classifier to be interpretable if its classification can be explained by a conjunction of a few simple questions about the data. Under this definition, standard decision trees (such as those learned by ID3 or CART) are considered interpretable. In contrast, boosting methods and Random Forests produce an unstructured set of weighted hypotheses that can obfuscate correlations among the features, sacrificing interpretability for improved predictive performance. As described below, it is shown that embodiments of the invention generate trees are interpretable, while obtaining predictive performance comparable to ensemble methods.

Representing a Model Produced by an Exemplary Ensemble Method as a Decision Tree Generally ensemble methods iteratively train a set of T decision stumps as the weak learners $\{h_1, \ldots, h_T\}$ in a stage-wise approach, where each subsequent learner favors correct classification of those data instances that are misclassified by previous learners. Each decision stump $h_t$ may focus on a particular feature $a_t$ of the vector x with a corresponding threshold to split the observations (e.g., at ="xj>3.411), and outputs a prediction $h_t(x, a_t) \in \{-1, +1\}$. Given a new data instance characterized by an observation vector x, these ensemble methods may predict the class label $F(x) \in \{-1, +1\}$ for that instance as:

$$F(x) = \text{sign}\left(\sum_{t=1}^{T} \beta_t h_t(x, a_t)\right). \quad (1)$$

where the weight $\beta_t \in \mathbb{R}$ of each decision stump $h_t$ depends upon its classification (training) error on the training data.

In some embodiments, the model produced by an exemplary ensemble method (e.g., AdaBoost) with decision stumps (one-node decision trees) can be represented as a decision tree. In some embodiments, such a model may be represented as an interpretable tree in accordance with at least some of the embodiments of the invention by constructing a tree with $2^T$ branches, where each path from the root to a terminal node contains T nodes. At each branch, from the top node to a terminal node, the stumps $h_1, \ldots, h_T$ from the ensemble method may be assigned, pairing each node of the decision tree with a particular attribute of the data and corresponding threshold. The final classification at each terminal node can be represented by Equation 1.

Figure 2:
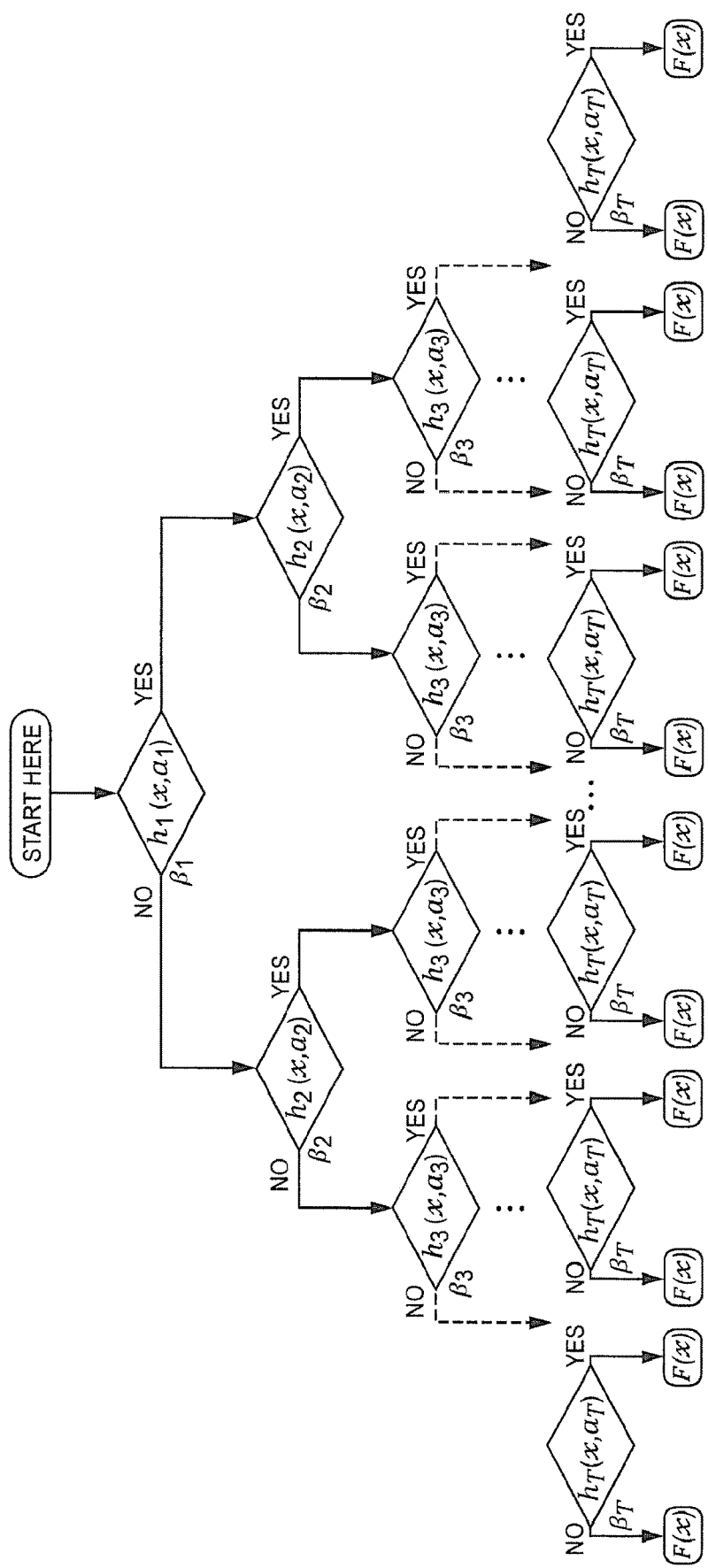
FIG. 2 illustrates an exemplary decision tree based on an exemplary ensemble method (e.g., AdaBoost) represented as an interpretable tree in accordance with at least some of the embodiments of the invention.

Since each $h_1$ outputs a binary prediction, the model learned by the exemplary ensemble method can be rewritten as a complete binary tree with height T by assigning $h_1$ to all internal nodes at depth t−1 with a corresponding weight of Br. The decision at each internal node may be given by $h_t(x,$ $a_t$), and the prediction at each terminal node may be given by F(x). Essentially, each path from the root to a terminal node may represent the same ensemble, but tracking the unique combination of predictions made by each $h_t$. FIG. 2 illustrates an exemplary decision tree based on an exemplary ensemble method (e.g., AdaBoost) represented as an interpretable tree in accordance with at least some of the embodiments of the invention.

The trivial representation of the model in the exemplary ensemble method as a tree, however, likely results in trees that are accurate but too large to be interpretable. Embodiments of the invention remedy this issue by 1) introducing diversity into the ensemble represented by each path through the tree via a membership function that accelerates convergence to a decision, and 2) pruning the tree in a manner that does not affect the trees predictions, as explained below.

Generating a Decision Tree Using an Exemplary Method

FIG. 3 illustrates a method for generating a decision tree having a plurality of nodes, arranged hierarchically as parent nodes and child nodes, according to at least one embodiment of the invention. In one embodiment, the method is referred to as MediBoost.

In some embodiments, the method may include generating a node. The step of generating a node may include receiving i) training data including data instances, each data instance having a plurality of attributes and a corresponding label, ii) instance weightings, iii) a valid domain for each attribute generated, and iv) an accumulated weighted sum of predictions for a branch of the decision tree. The step of generating a node may also include associating one of a plurality of binary prediction of an attribute with each node including selecting the one of the plurality of binary predictions having a least amount of error. The step of generating a node may also include determining whether a node includes child nodes or whether the node is a terminal node. The step of generating a node may also include in accordance with a determination that the node includes child nodes, repeat the generating the node step for the child nodes. The step of generating a node may also include in accordance with a determination that the node is a terminal node, associating the terminal node with an outcome classifier.

Figure 4:
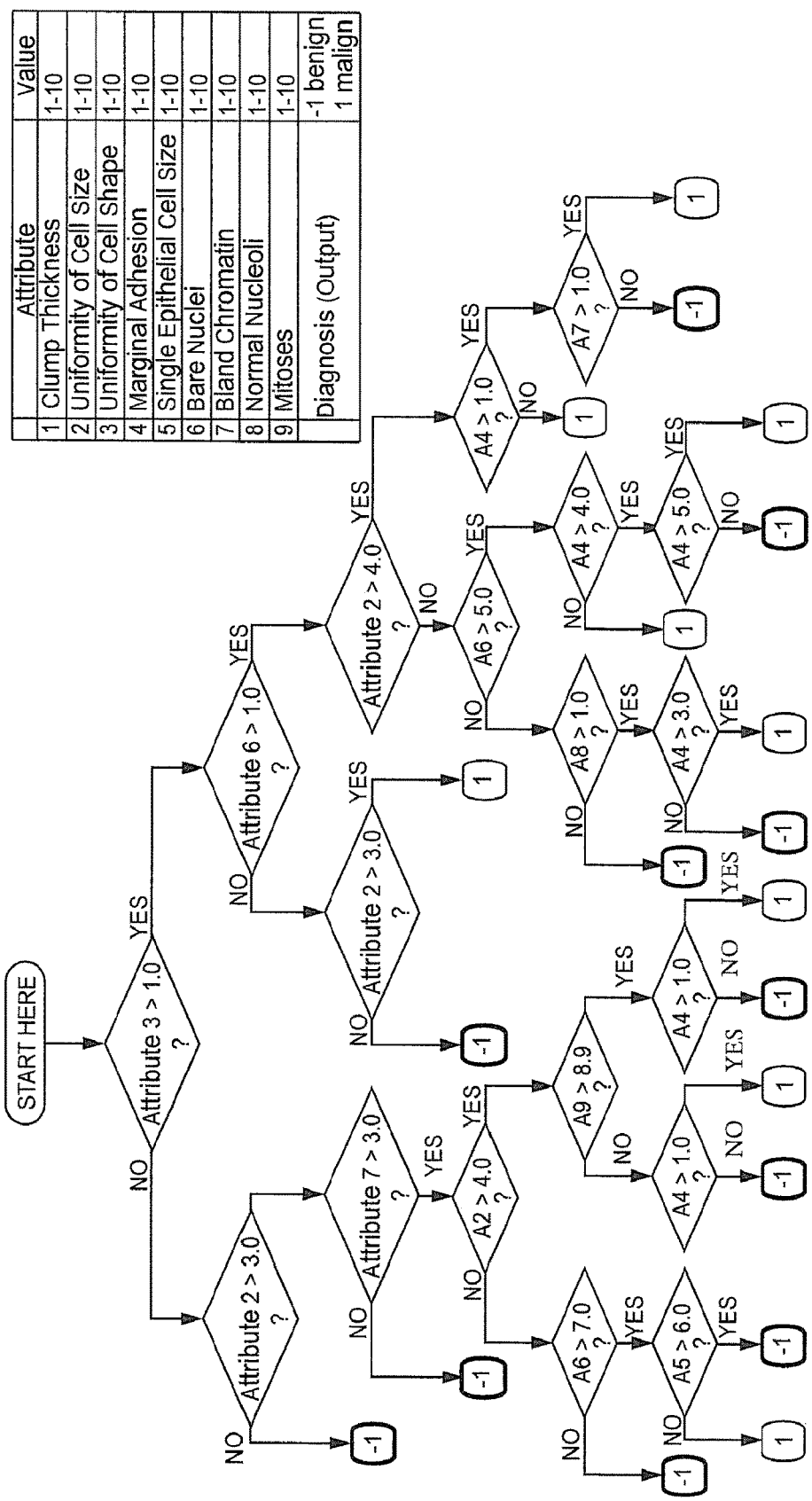
FIG. 4 illustrates an exemplary decision tree generated according to at least one of the embodiments of the invention.

In some embodiments, the method may include displaying the decision tree including the plurality of nodes arranged hierarchically. FIG. 4 illustrates an exemplary decision tree generated according to at least one of the embodiments of the invention.

Turning back to FIG. 3, in some embodiments, the step of generating the node may include foregoing generating the node i) having a binary prediction that is inconsistent with a parent node.

In some embodiments, the step of generating the node may include updating instance weightings for child nodes including incorporating an acceleration term to reduce consideration for data instances having labels that are inconsistent with the tree branch and utilizing the instance weightings during the generating the node step repeated for the child nodes.

In some embodiments, the step of generating the node may include updating the valid domain and utilizing the valid domain during generation of the child nodes.

In some embodiments, the step of generating the node may include foregoing generating the node having a sibling node with an identical outcome classifier.

To users who want interpretable models, the fact that a decision tree is generated in accordance with embodiments of the invention via boosting and not the maximization of information gain (as standard in decision tree induction) is irrelevant. As long as the decision nodes represent disjoint subpopulations and all observations within a terminal node have the same classification, the trees can be highly interpretable. Traditional decision trees do recursive partitioning; each node of the tree further subdivides the observed data, so that as one goes farther down the tree, each branch has fewer and fewer observations. This strongly limits the possible depth of the tree as the number of available observations typically shrinks exponentially with tree depth. In this 'greedy search' over data partitions, assigning an observation on the first nodes of the tree to incorrect branches can greatly reduce their accuracy. In AdaBoost, and in its trivial representation as a tree, although different observations are weighted differently at each depth (based on classification errors made at the previous level), no hard partitioning is performed; all observations contribute to all decision nodes. Having all observations contribute equally at each branch, as is done by boosting methods, however, might result in trees that are accurate but too large to be interpretable. In fact, it is not unusual for AdaBoost or Gradient Boosting (an AdaBoost generalization to different loss functions) to combine hundreds of stump decisions.

To remedy these issues, at least some embodiments of the invention (e.g., embodiments implementing Mediboost) weights how much each observation contributes to each decision node, forming a relative "soft" recursive partition, similar to decision trees grown with fuzzy logic in which observations have a "degree of membership" in each node. These embodiments merge the concepts of decision trees, boosting and fuzzy logic by growing decision trees using boosting with the addition of a membership function that accelerates its convergence at each individual branch, and enables pruning of the resulting tree in such a manner that does not affect its accuracy. These embodiments thus give the best of both worlds: they do not do a hard recursive partitioning, but they still grow a single interpretable tree via boosting. It is the combination of the soft assignment of observations to decision tree splits through the membership function and the boosting framework to minimize a loss function that provides the improvement in accuracy over regular decision trees.

Because at least some embodiments at their core are a boosting framework, different boosting methods including Gradient Boosting, and Additive Logistic Regression with different loss functions can be used to construct specific decision tree induction algorithms. As discussed in more detail below, two exemplary embodiments of the invention: 1). MediAdaBoost (MAB) using Additive Logistic Regression and 2.) Likelihood MediBoost (LMB) using Gradient Boosting, are described in further detail. MAB, similar to AdaBoost, can be obtained by minimizing an exponential loss function using Additive Logistic Regression with the addition of a membership function. MAB can find each node of the decision tree not only by focusing on the data instances that previous nodes have misclassified as in AdaBoost, but also focusing more on instances with higher probability of belonging to that node as in fuzzy logic. Conversely, LMB can be obtain using Gradient Boosting by finding the split that minimizes the quadratic error of the first derivative of the binomial log-likelihood loss function and determining the coefficients according to the same framework (see supplementary materials). Reinterpreting MediBoost using Gradient Boosting can not only allow different loss functions, but also provide the necessary mechanisms to add regularization beyond penalizing for the size of the tree (as is sometimes done in regular decision trees) in order to obtain better generalization accuracy. Additionally, embodiments of the invention can easily be extended to regression.

Generating a Decision Tree Using an Alternative Exemplary Methods

FIG. 5 illustrates a method for generating a decision tree having a plurality of nodes, arranged hierarchically as parent nodes and child nodes, according to at least one embodiment of the invention. In one embodiment, the method is referred to as MediAdaBoost (MAB).

At each node of the tree, MAB can train a weak learner to focus on the data instances that previous nodes have misclassified, as in AdaBoost. In addition, MAB can incorporate an acceleration term (second terms in lines 6a and 6b) to penalize instances whose labels disagree with the tree branch, focusing each branch more on instances that seem to have higher probability of following the corresponding path, as in fuzzy logic. While growing the tree, MAB can also prunes (line 11) impossible paths based on previous decisions on the path to the root (lines 7-8).

This algorithm can be obtained if the expected value of the exponential loss function $L(F)=E(\exp(-yF(x))$ is minimized with respect to the ensemble classification rule $F(x)$ using an additive logistic regression model via Newton-like updates. Some embodiments of the invention include the acceleration term (A) based on a membership function to diversify the ensembles and speed their convergence.

In some embodiments, $L(F)=E(e^{yF(x)})$ is the loss function of the tree at an arbitrary terminal node $N_T$. Assuming a current estimate of the function $F_{T-1}(x)$ corresponding to a tree of depth T 1 the estimate can be improved by adding an additional split at one of the terminal nodes $N_{T-1}$ that will define two more terminal nodes, children of $N_{T-1}$, using an additive step:

$$F_T(x) = F_{T-1}(x) + \beta_T h_T(x, \alpha_T), \quad (2)$$

where $\beta_T$ is a constant, and $h_T(x, \alpha_T) \in \{1, +1\}$ represents the classification of each observation with decision predicate $\alpha_T$ to split the observations at $N_T$. The new loss function can be:

$$L(F_{T-1}(x) + \beta_T h_T(x, \alpha_T)) = \mathbb{E}(\exp(-yF_{T-1}(x) - y\beta_T h_T(x, \alpha_T))). \quad (3)$$

Taking into account that $F(x)$ is fixed and expanding exp $(yF_{T-1}(x) \ y\beta_T h_T(x, \alpha_T))$ around $h_T = h_T(x, \alpha_T) = 0$ (for some predicate $\alpha_T$) as a second-order polynomial (for a fixed $\beta_T$ and x) we obtain:

$$L(F_{T-1}(x) + \beta_T h_T) \approx \mathbb{E}\left(e^{-yF_{T-1}(x)}\left(1 - y\beta_T h_T + \frac{\beta_T^2 y^2 h_T^2}{2}\right)\right). \quad (4)$$

Since $y \in \{-1,+1\}$ and $h_T \in \{-1, +1\}$, we have $y^2=1$ and $h^2_T=1$, so:

$$L(F_{T-1}(x) + \beta_T h_T) \approx \mathbb{E}\left(e^{-yF_{T-1}(x)}\left(1 - y\beta_T h_T + \frac{c^2}{2}\right)\right), \quad (5)$$

where c is a constant. Minimizing Equation 5 with respect to $h_T$ for a fixed x yields:

$$a_T = \underset{\alpha}{\mathrm{argmin}}\ \mathbb{E}_w((1 - y\beta_T h_T(x, a) + c^2/2|x)), \quad (6)$$

where $\mathbb{E}_w(\cdot|x)$ refers to the weighted conditional expectation in which the weight of each instance $(x_i, y_i)$ is given by $$w(i) = e^{-yF_{T-1}(x_i)} M(x_i, T-1),$$

with an acceleration term M(x, T 1) that emphasizes instances with predicted labels that agree with the corresponding branch of the tree. The introduction of this acceleration term can be a key step that leads to MediAdaBoost, differentiating these embodiments of the invention from Discrete AdaBoost, and making each path through the tree converge to a different ensemble of nodes.

If $\beta_T > 0$, Equation 6 is equivalent to $$a_T = \underset{\alpha}{\mathrm{argmax}} \mathbb{E}_w(yh_T(x, a)|x) \quad (7)$$

$$= \underset{\alpha}{\mathrm{argmin}} - \mathbb{E}_w(yh_T(x, a)|x) = \frac{\underset{\alpha}{\mathrm{argmin}}\mathbb{E}_w(y - h_T(x, a))^2}{2} - 1,$$

where consideration is taken that $y^2 = 1$ and $(h_T(x, \alpha))^2 = 1$.

Equation 7 indicates that in order to minimize the expected loss, $h_T(x, \alpha_T)$ can be obtained using a weighted least square minimization over the training data. Given $h_T(x, \alpha_T)$, $\beta_T$ is obtained as:

$$\beta_T = \underset{\beta}{\mathrm{argmin}} \mathbb{E}_w(\exp(-\beta y h_T(x, a_T))), \quad (8)$$

which can be shown to be:

$$\beta_T = \frac{1}{2}\log\left(\frac{1 - err_T}{err_T}\right), \quad (9)$$

where $err_T = \mathbb{E}_w(\mathbb{1}(y_i \neq h_T(x_i, a_T)))$ with $\mathbb{1}(p) = \begin{cases} 1 & \text{if predicate } p \text{ is true} \\ 0 & \text{otherwise} \end{cases}$ Therefore, the new function at $N_T$ is given by $$F_T(x) = F_{T-1}(x) + \frac{1}{2}\log\left(\frac{1 - err_T}{err_T}\right) h_T(x, a_T),$$

where $h_T(x, \alpha_T)$ is the decision stump that results from solving Equation 7. Let $\{N_1, \ldots, N_T\}$ denote the path from the root node to $N_T$. To yield MAB, the acceleration term is set to be:

$$M(x, T-1) = \exp\left(-A\sum_{t=1}^{T-1} \mathbb{1}(h_t(x, a_t) = -\mathrm{child}(N_t, N_{t+1}))\right), \quad (10)$$

where A is an acceleration constant and child($N_t, N_{t+1}$) =

$$\begin{cases} -1 & \text{if } N_t \cdot \text{left} = N_{t+1} \\ +1 & \text{if } N_t \cdot \text{right} = N_{t+1} \end{cases}$$

thereby penalizing the weight of x by $e^A$ each time the instance may be predicted to belong to a different path. If A is set to 0, then every path through the resulting tree can be identical to the AdaBoost ensemble for the given problem. As the constant A increases, the resulting MAB tree can converge faster and the paths through the tree represent increasingly diverse ensembles. MAB may also prune branches that are impossible to reach by tracking the valid domain for every at-tribute and eliminating impossible-to-follow paths during the training process. As a final step, post-pruning the tree bottom-up can occur by recursively eliminating the parent nodes of leaves with identical predictions, further compacting the resulting decision tree.

In this section, MediBoost can be generalized to any loss function using the gradient boosting framework. As in the case of MAB, assuming a current estimate of the function $F_{T-1}(x)$ corresponding to a tree of depth T−1 and this estimate can be improved by adding an additional split at one of the terminal nodes $N_{T-1}$ that will define two more terminal nodes, children of $N_{T-1}$, using an additive step. The function at depth T is then given by $F_T(x)=F_{T-1}(x)+\beta_T h_T(x, \alpha_T)$. Additionally, we can define a loss function over one observation $(x_i, y_i)$ as:

$$\ell(y_i, F_T(x_i)) = \ell(y_i, F_{T-1}(x_i) + \beta_T h_T(x_i, a_T)), \quad (11)$$

and a loss function over all observations as $$L = \sum_{i=1}^{N} \ell(y_i, F_{T-1}(x_i) + \beta_T h_T(x_i, a_T))M(x_i, T-1), \quad (12)$$

where $M(x_i, T-1)$ is a membership function of the observation $x_i$ at node $N_{T-1}$ as defined in the previous section. There is interest in finding the $\{\beta_T, a_T\}$ that minimize Equation 12, which can be interpreted as the expected value of the loss function over a discrete number of observations.

Using a greedy stage-wise approach to minimize Equation 12, $\beta_T h_T(x_i, \alpha_T)$ can be interpreted as the best greedy step to minimize Equation 12 under the constraint that the step direction $h_T(x_i, \alpha_T)$ is a decision stump parameterized by $a_T$. Therefore, using gradient steepest descent, $\beta_T h_T(x_i, \alpha_T)$ is found that is most correlated to $$\frac{\partial \ell(y_i, F_T(x_i))}{\partial F_T(x_i)}.$$

One solution is to find the predicate $\alpha_T$ and weight $\beta_T$ by solving $$\{\alpha_T, \beta_T\} = \underset{\alpha, \beta}{\operatorname{argmin}} \sum_{i=1}^{N} \left[ \frac{\partial \ell(y_i, F_T(x_i))}{\partial F_T(x_i)} - \beta h(x_i, \alpha) \right]^2 M(x_i, T-1); \quad (13)$$

Equation 13 is equivalent to finding $\alpha_T$ that minimizes the quadratic loss function of a regression tree fitted to the pseudo-response $$\frac{\partial \ell(y_i, F_T(x_i))}{\partial F_T(x_i)}.$$

Once, $\alpha_T$ has been found to yield the weak learner $h_T(x)=h_T(x_i, \alpha_T)$, the quadratic Taylor expansion of Equation 11 can be used:

$$\ell(y_i, F_T(x_i)) = \ell(y_i, F_{T-1}(x_i)) + \frac{\partial \ell(y_i, F_{T-1}(x_i))}{\partial F_{T-1}(x_i)} \beta_T h_T(x_i) + \frac{1}{2} \frac{\partial^2 \ell(y_i, F_{T-1}(x_i))}{\partial^2 F_{T-1}(x_i)} (\beta_T h_T(x_i))^2 \quad (14)$$

in combination with Equation 12 to obtain the value of $\beta_T$. Additionally, defining $$g_i = \frac{\partial \ell(y_i, F(x_i))}{\partial F(x_i)} \text{ and } \kappa = \frac{\partial^2 \ell(y_i, F(x_i))}{\partial^2 F(x_i)},$$

Equation 12 can be rewritten as:

$$L = \sum_{i=1}^{N} \left[ \ell(y_i, F(x_i)) + g_i \beta h(x_i, \alpha) + \frac{1}{2} k_i (\beta h(x_i, \alpha))^2 \right] M(x_i). \quad (15)$$

Finally, realizing that:

$$\beta h(x_i, \alpha) = \sum_{j=1}^{2} c_j \mathbb{1}(x_i \in R_j) \quad (16)$$

where $R_j$ indicates to the two regions represented by the stump $h(x_i, \alpha)$ and $c_j$ are constants. Therefore, substituting Equation 16 into Equation 15, gives the following:

$$L = \sum_{i=1}^{N} \left[ \ell(y_i, F(x_i)) + g_i \sum_{j=1}^{2} c_j \mathbb{1}(x_i \in R_j) + \frac{1}{2} k_i \left( \sum_{j=1}^{2} c_j \mathbb{1}(x_i \in R_j) \right)^2 \right] M(x_i). \quad (17)$$

There is interest in finding the $c_i$ that minimize Equation 17 given the split obtained using Equation 13. The terms that do not depend on $c_j$ can be removed from this optimization problem. After a few arrangements a new loss function is obtained:

$$L = \sum_{j=1}^{2} \left( \sum_{i \in I_j} g_i M(x_i) \right) * c_j + \frac{1}{2} \left( \sum_{i \in I_j} k_i M(x_i) \right) c_j^2, \quad (18)$$

where $I_j$ represents the observations that belong to $R_j$. Finally, writing explicitly the optimization problem and calling $G_j = \Sigma_{i \in I_j} g_i M(x_i)$ and $K_j = \Sigma_{i \in I_j} k_i M(x_i)$:

$$\{c_j\}_{j=1}^{2} = \underset{w_j}{\operatorname{argmin}} \sum_{j=1}^{2} \left[ G_j c_j + \frac{1}{2} K_J c_j^2 \right] \quad (19)$$

whose solution is:

$$c_- = -\frac{G_-}{K_-} \quad (20)$$

$$c_+ = -\frac{G_+}{K_+},$$

where in the pair of Equation 20 we have substituted J by (+)=Right and (−)=Left corresponding to the observations on the right or left nodes that are children of $N_{T-1}$.

In some embodiments, regularization may be utilized. In these embodiments, regularization generally limits the depth of the decision tre. A L2-norm penalization on $c_j$ can be added to Equation 18 as follows:

$$\operatorname*{argmin}_{w_j} \sum_{j=1}^{2}\left[ G_j c_j + \frac{1}{2} K_J c_j^2 + \lambda c_j^2 \right] \quad (21)$$

with the subsequent coefficients given by:

$$c_- = -\frac{G_-}{K_- + \lambda}$$
$$c_+ = -\frac{G_+}{K_+ + \lambda},$$

Finally, the concept of shrinkage or learning rate, LR, regularly used in gradient Boosting can also be applied to MediBoost. In this case, the pair of Equations above will be given by:

$$c_- = -\frac{LR * G_-}{K_- + \lambda} \quad (22)$$
$$c_+ = -\frac{LR * G_+}{K_+ + \lambda},$$

where learning rate (LR) is a constant, the shrinkage or learning rate constant, can be 0.1. Each of these regularization methods can be used independently of each other.

Generating a Decision Tree Using an Alternative Exemplary Methods

FIG. 6 illustrates a method for generating a decision tree having a plurality of nodes, arranged hierarchically as parent nodes and child nodes, according to at least one embodiment of the invention. In one embodiment, the method is referred to as LikelihoodMediBoost (LMB).

Gradient Boosting with binomial log-likelihood as the loss function typically outperforms embodiments employing AdaBoost, and typically results in a more accurate algorithm with fewer branches. Using the embodiments described above, LMB can be derived using deviance as the loss function.

$$\ell(y_i, F(x_i)) = \log(1 + e^{-2y_i F(x_i)}), \; y \in \{-1, +1\}$$

Because a log-likelihood loss was assumed, $F(x_i)$ can also be interpreted as:

$$F(x_i) = \frac{1}{2}\log\left(\frac{Pr(y=1 \mid x_i)}{Pr(y=-1 \mid x_i)}\right), \quad (23)$$

where $Pr(y=1|x_i)$ and $Pr(y=-1|x_i)$ are the probabilities of y being equal to 1 or −1, respectively. This can justify classifying $y_i$ as sign $(F(x_i))$.

Finding the first and second derivative of the loss function provides the following:

$$g_i = \frac{\partial \ell(y_i, F(x_i))}{(\partial F(x_i))} = \frac{-2y_i}{\left(1 + e^{2y_i F(x_i)}\right)} \quad (24)$$

$$k_i = \frac{\partial^2 \ell(y_i, F(x_i))}{(\partial^2 F(x_i))} = \|g_i\|(2 - \|g_i\|) \quad (25)$$

and using the definitions of $G_j$ and $K_j$ together with Equation 22, the coefficients can be rewritten at each split of LMB as:

$$c_- = -\frac{LR * G_-}{K_- + \lambda} \quad c_+ = -\frac{LR * G_+}{K_+ + \lambda}, \quad (26)$$

where $0 < LR \leq 1$ is the shrinkage or learning rate regularization parameter and $\lambda$ is the regularization on the weights assuming L2 norm penalty. If LR=1 and $\lambda$=0 then no regularization is applied. With these clarifications and using a similar membership function as in the case of MAB we are ready to write the LMB algorithm as shown below.

Results

To demonstrate that embodiments of the invention have similar accuracy as ensemble methods while maintaining interpretability like regular decision trees, the two exemplary embodiments were evaluated on 13 diverse classification problems from the UCI Machine Learning Repository (http://archive.ics.uci.edu/ml/) covering different subfields of medicine (see supplementary materials); these datasets represented all available binary medical classification problems in the UCI Repository.

For these evaluations, MediAdaBoost (MAB) was because of its simplicity, and LikelihoodMediBoost (LMB) because the binomial log-likelihood loss function has been shown to outperform AdaBoost in classification problems. The performances of LMB and MAB were compared with ID3 (our own implementation), CART, LogitBoost and Random Forests (Matlab R2015). All results were averaged over 5-fold cross-validation on the data sets, with hyper-parameters chosen in an additional 5-fold cross-validation on the training folds (see the supplementary materials for details).

As shown in Table 1, LMB with its default settings is better than its decision tree cousins (ID3 and CART) on 11 out of the 13 problems.

TABLE 1

| LMB vs | ID3 | CART | LogitBoost | Random Forests |
|---|---|---|---|---|
| wins | 12 | 11 | 6 | 4 |
| losses | 1 | 1 | 5 | 8 |
| ties | 0 | 1 | 2 | 1 |

Figure 7A:
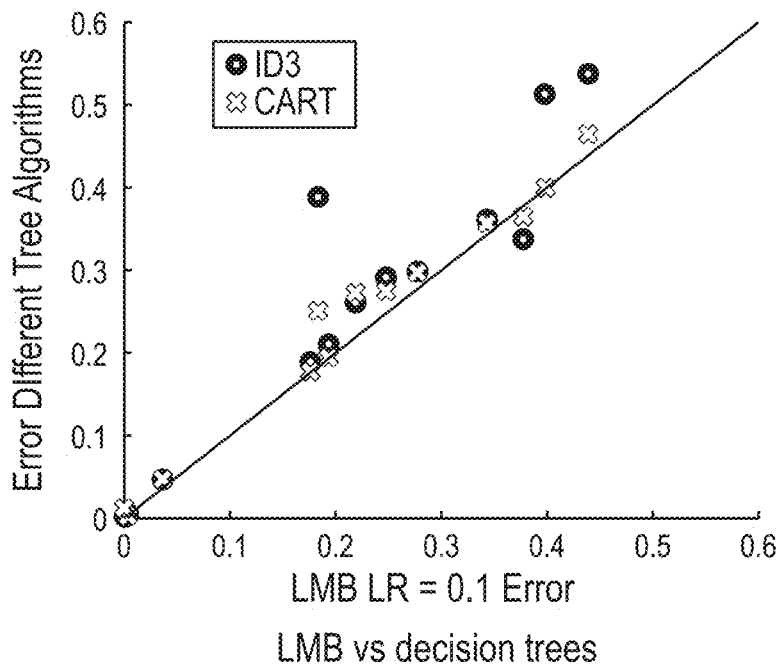
FIGS. 7A-7B illustrates a graphical example of the comparison of the absolute error values between LMB and different machine learning algorithms.
Figure 7B:
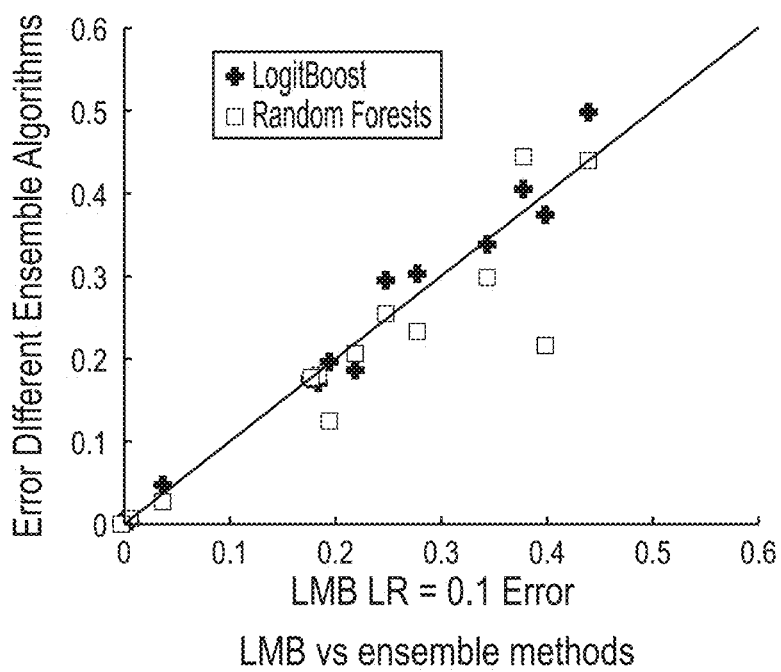

FIGS. 7A-7B illustrates a graphical example of the comparison of the absolute error values between LMB and different machine learning algorithms. These results are statistically significant in a two-way sign-to-sign test. In one of the problems where the default LMB was not superior, the standard decision trees also outperformed the ensemble methods. In a three-way ANOVA comparison of the cross-validation errors between LMB, ID3 and CART across all problems, LMB was significantly better than ID3 ($p=10^{-8}$) and CART (p=0.014). In comparison to the ensemble methods, LMB was indistinguishable from LogitBoost (p=0.44) and worse than Random Forests (p=0.0004). Comparison of algorithms using ANOVA tests has been pointed out to be less robust than the Friedman test, and so we also performed that test. LMB was significantly better than ID3 (p=0.006) and CART (p=0.09) at the 90% confidence interval in a three-way Friedman test, but not significantly different from either LogitBoost (p=0.97) or Random forests (p=0.30). Similar results were obtained when LMB was run with a learning rate of 0.1.

Additionally, as shown in Table 2, MAB gave similar results, though slightly worse but not statistically significant, to those obtained using LMB.

TABLE 2

| MAB vs | ID3 | CART | LogitBoost | Random Forests |
|---|---|---|---|---|
| wins | 11 | 10 | 5 | 4 |
| losses | 1 | 2 | 6 | 8 |
| ties | 1 | 1 | 2 | 1 |

Figure 8A:
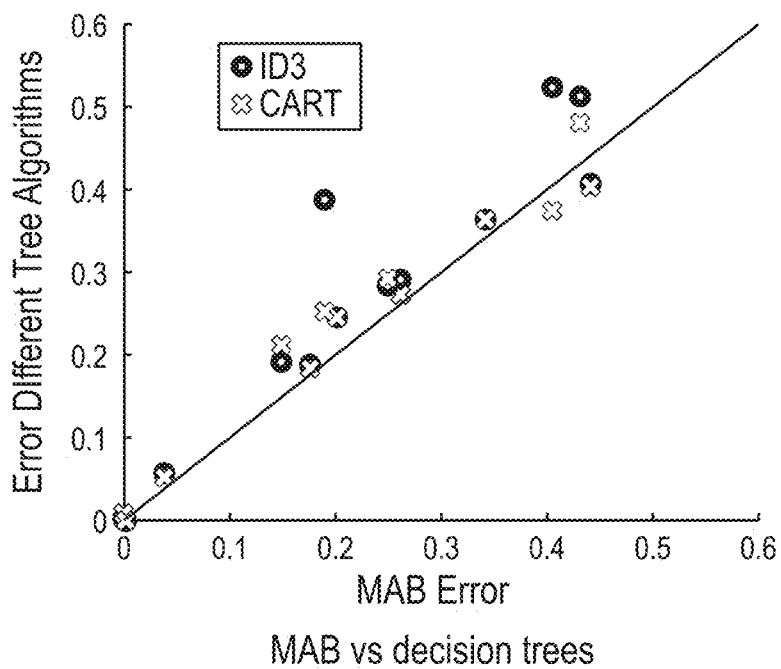
FIGS. 8A-8B illustrates a graphical example of the comparison of the absolute error values between MAB and different machine learning algorithms.
Figure 8B:
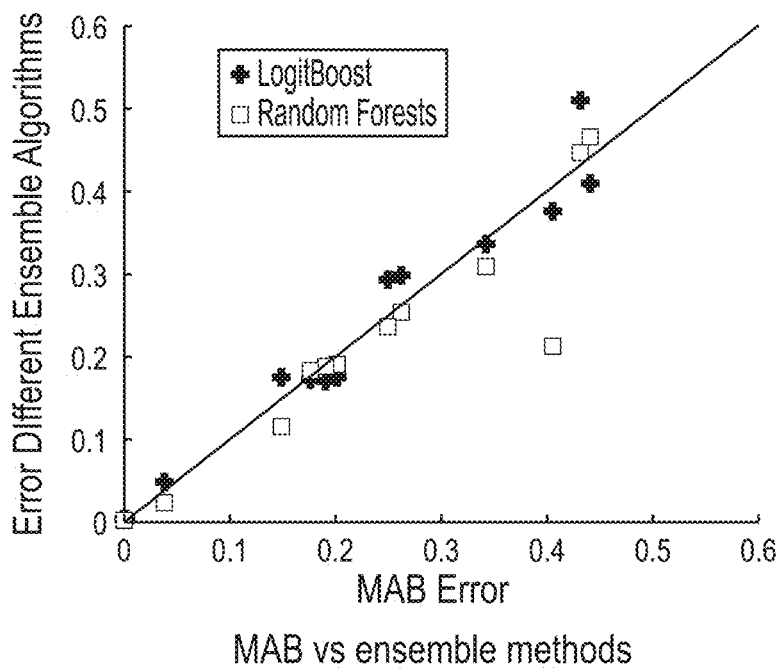

FIGS. 8A-8B illustrates a graphical example of the comparison of the absolute error values between MAB and different machine learning algorithms. In these figures, points above the black line indicate results where MAB was better. As illustrated, MAB is significantly better than decision tree algorithms and indistinguishable from ensemble methods.

Therefore, based on both ANOVA and Friedman tests, we conclude that MediBoost in its various forms is significantly better than current decision tree algorithms and has comparable accuracy to ensemble methods.

FIGS. 9A-9B illustrates a graphical example of the effects of acceleration parameter on the training error (e.g., FIG. 9A) and testing error (e.g., FIG. 9B). This parameter was applied for four different data sets and two different algorithms (MAB and LMB). In all cases, the training error decreases as the accerlation parameter increases (accelerating the convergence of the algorithm) while the testing error improves or remains the same.

Additionally, some embodiments of the invention retains the interpretability of conventional decision trees (see e.g., FIG. 4). The interpretability of some embodiments of the invention is not only the result of representing it as a tree, but also the significant shrinkage obtained compared to boosting. This shrinkage is due to the introduction of the membership function controlled by the acceleration parameter, elimination of impossible paths that are result of the introduction of fuzzy logic, and a post-training pruning approach that does not change the model's accuracy. Once a deep decision tree is grown (eg. with a depth of 15) in accordance with embodiments of the invention, all branches that do not change the sign of the classification of its parent nodes can be pruned without loss of accuracy. This pruning approach has been used to represent the decision tree in FIG. 4. This tree is not only accurate, but also interpretable; physicians can readily incorporate it into their practice without knowledge of the underlying machine learning algorithm.

To summarize, utilizing embodiments of the invention results in trees that retain all the desirable traits of its decision tree cousins while obtaining similar accuracy to ensemble methods. It thus has the potential to be the best off-the-shelf classifier in fields such as medicine where both interpretability and accuracy are of paramount importance and change as such the way clinical decisions are made.

Figure 10:
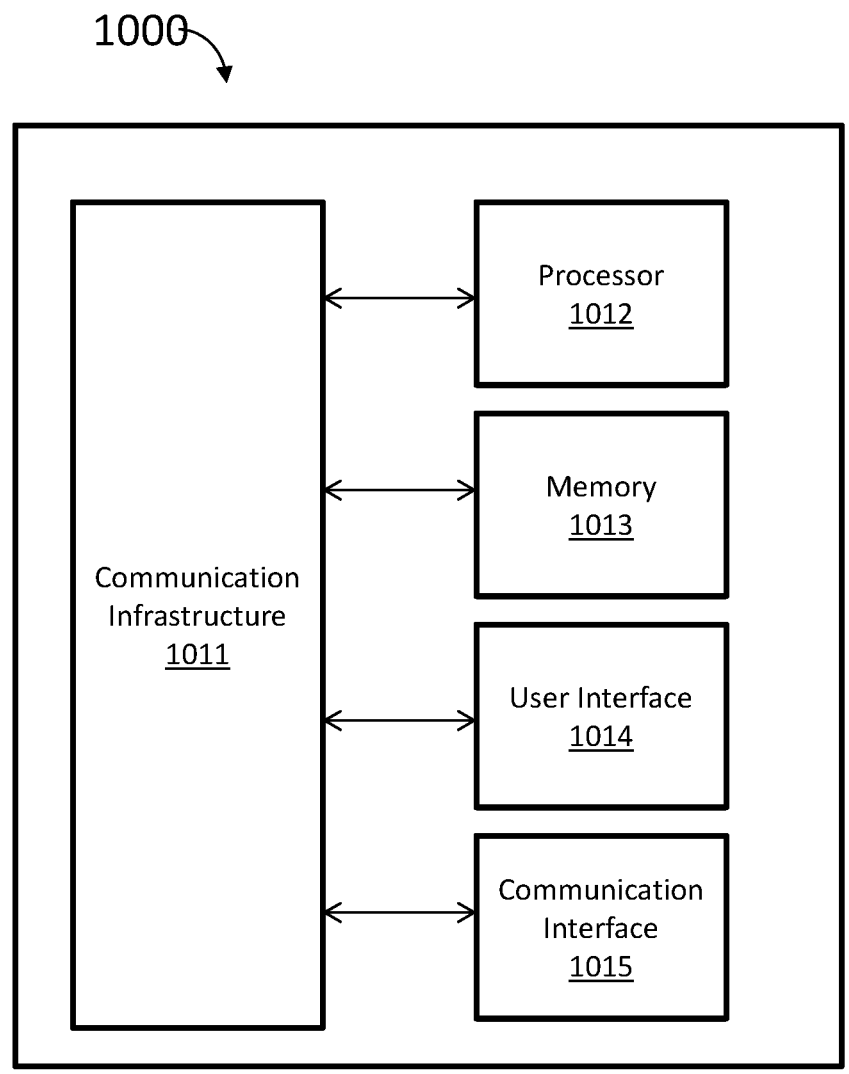
FIG. 10 illustrates an exemplary computing system for implement at least some of the methods in accordance with at least some of the embodiments of the invention.

FIG. 10 illustrates an exemplary computing system for implement at least some of the methods in accordance with at least some of the embodiments of the invention. Some embodiments of the present invention may be implemented as programmable code for execution by computer system 1000. However, it is contemplated that other embodiments of the present invention may be implemented using other computer systems and/or computer architectures.

Computer system 1000 may include communication infrastructure 1011, processor 1012, memory 1013, user interface 1014 and/or communication interface 1015.

Processor 1012 may be any type of processor, including but not limited to a special purpose or a general-purpose digital signal processor. Processor 1012 may be connected to a communication infrastructure (e.g. a data bus or computer network) either via a wired connection or a wireless connection. Various software implementations are described in terms of this exemplary computer system. After reading this description, it will become apparent to a person skilled in the art how to implement the invention using other computer systems and/or computer architectures.

Memory 1013 may include at least one of: random access memory (RAM), a hard disk drive and a removable storage drive, such as a floppy disk drive, a magnetic tape drive, or an optical disk drive, etc. The removable storage drive reads from and/or writes to a removable storage unit. The removable storage unit can be a floppy disk, a magnetic tape, an optical disk, etc., which is read by and written to a removable storage drive. Memory 1013 may include a computer usable storage medium having stored therein computer software programs and/or data to perform any of the computing functions of computer system 1000. Computer software programs (also called computer control logic), when executed, enable computer system 1000 to implement embodiments of the present invention as discussed herein. Accordingly, such computer software programs represent controllers of computer system 1000.

Memory 1013 may include one or more datastores, such as flat file databases, hierarchical databases or relational databases. The one or more datastores act as a data repository to store data such as flat files or structured relational records. While embodiments of the invention may include one or more of the memory or datastores listed above, it is contemplated that embodiments of the invention may incorporate different memory or data stores that are suitable for the purposes of the described data storage for computer system 1000.

User interface 1014 may be a program that controls a display (not shown) of computer system 1000. User interface 1014 may include one or more peripheral user interface components, such as a keyboard or a mouse. The user may use the peripheral user interface components to interact with computer system 1000. User interface 1014 may receive user inputs, such as mouse inputs or keyboard inputs from the mouse or keyboard user interface components.

Communication interface 1015 may allow data to be transferred between computer system 1000 and an external device. Examples of communication interface 1015 may include a modem, a network interface (such as an Ethernet card), a communication port, a Personal Computer Memory Card International Association (PCMCIA) slot and card, etc. Data transferred via communication interface 1015 may be in the form of signals, which may be electronic, electromagnetic, optical, or other signals capable of being transmitted or received by communication interface. These signals are provided to or received from communication interface 1015 and the external device via a network.

In at least one embodiment, there is included one or more computers having one or more processors and memory (e.g., one or more nonvolatile storage devices). In some embodiments, memory or computer readable storage medium of memory stores programs, modules and data structures, or a subset thereof for a processor to control and run the various systems and methods disclosed herein. In one embodiment, a non-transitory computer readable storage medium having stored thereon computer-executable instructions which, when executed by a processor, perform one or more of the methods disclosed herein.

EXEMPLARY EMBODIMENTS

Additive models, such as produced by gradient boosting, and full interaction models, such as classification and regression trees (CART), are algorithms that have been investigated largely in isolation. However, these models exist along a spectrum, identifying deep connections between these two approaches. In some embodiments, there is a technique or method called tree-structured boosting for creating hierarchical ensembles, and this method can produce models equivalent to CART or gradient boosting by varying a single parameter. Notably, tree-structured boosting can produce hybrid models between CART and gradient boosting that can outperform either of these approaches.

1 Introduction

CART analysis is a statistical learning technique, which can be applicable to numerous other fields for its model interpretability, scalability to large data sets, and connection to rule-based decision making. CART can build a model by recursive partitioning the instance space, labeling each partition with either a predicted category (in the case of classification) or real-value (in the case of regression). CART models can often have lower predictive performance than other statistical learning models, such as kernel methods and ensemble techniques. Among the latter, boosting methods were developed as a means to train an ensemble of weak learners (often CART models) iteratively into a high-performance predictive model, albeit with a loss of model interpretability. In particular, gradient boosting methods focus on iteratively optimizing an ensemble's prediction to increasingly match the labeled training data. These two categories of approaches, CART and gradient boosting, have been studied separately, connected primarily through CART models being used as the weak learners in boosting. However, there is a deeper and surprising connection between full interaction models like CART and additive models like gradient boosting, showing that the resulting models exist upon a spectrum. In particular, described herein are the following contributions:

Introduction of tree-structured boosting (TSB) as a new mechanism for creating a hierarchical ensemble model that recursively partitions the instance space, forming a perfect binary tree of weak learners. Each path from the root node to a leaf represents the outcome of a gradient-boosted ensemble for a particular partition of the instance space.

Proof that TSB generates a continuum of single tree models with accuracy between CART and gradient boosting, controlled via a single tunable parameter of the algorithm. In effect, TSB bridges between CART and gradient boosting, identifying new connections between additive and full interaction models.

This result is verified empirically, showing that this hybrid combination of CART and gradient boosting can outperform either approach individually in terms of accuracy and/or interpretability. The experiments also provide further insight into the continuum of models revealed by TSB.

2 Background on CART and Boosting

Figure 11:
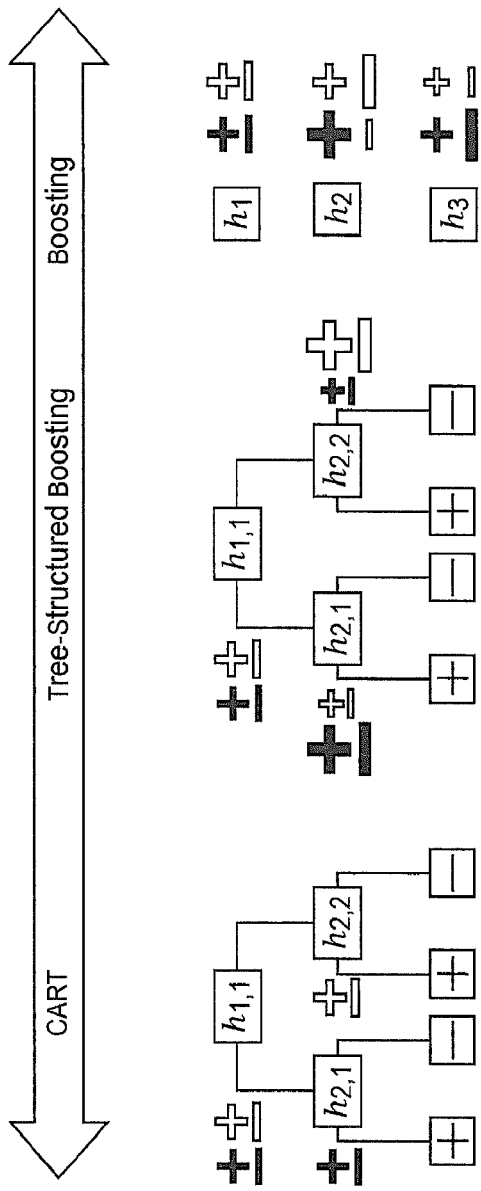
FIG. 11 illustrates a graphical representation of CART, Tree-Structured Boosting and Boosting, each given four training instances, according to at least one embodiment of the invention.

Assume there is a training set $(X, y) = \{(x_i, y_i)\}_{i=1}^N$, where each d-dimensional $x_i \in X \subseteq_x$ has a corresponding label $y_i \in Y$, drawn i.i.d from a unknown distribution D. In a classification setting, $Y = \{\pm 1\}$; in regression, $Y = \mathbb{R}$. One goal is to learn a function $F: X \to Y$ that will perform well in predicting the label on new examples drawn from D. CART analysis recursively partitions x, with F assigning a single label in Y to each partition. In this manner, there can be full interaction between each component of the model. Different branches of the tree are trained with disjoint subsets of the data, as shown in FIG. 11.

In contrast, boosting iteratively trains an ensemble of T weak learners $\{h_t: X \to Y\}_{t=1}^T$, such that the model is a weighted sum of the weak learners' predictions $F(x) = \Sigma_{t=1}^T p_t h_t(x)$ with weights $p \in \mathbb{R}^T$. Each boosted weak learner is trained with a different weighting of the entire data set, unlike CART, repeatedly emphasizing mispredicted instances to induce diversity (FIG. 11). Gradient boosting with decision stumps or simple regression can create a pure additive model, since each new ensemble member serves to reduce the residual of previous members. Interaction terms can be included in the overall ensemble by using more complex weak learners, such as deeper trees.

Classifier ensembles with decision stumps as the weak learners, $h_t(x)$, can be trivially rewritten as a complete binary tree of depth T, where the decision made at each internal node at depth t−1 is given by $h_t(x)$, and the prediction at each leaf is given by $F(x)$. Intuitively, each path through the tree represents the same ensemble, but one that tracks the unique combination of predictions made by each member.

3 Tree-Structured Boosting

This interpretation of boosting lends itself, however, to the creation of a tree-structured ensemble learner that bridges between CART and gradient boosting. The idea in tree-structured boosting (TSB) is to grow the ensemble recursively, introducing diversity through the addition of different sub-ensembles after each new weak learner. At each step, TSB first trains a weak learner on the current training set $\{(x_i, y_i)\}_{i=1}^N$ with instance weights $w \in \mathbb{R}^N$, and then creates a new sub-ensemble for each of the weak learner's outputs. Each sub-ensemble can be subsequently trained on the full training set, but instances corresponding to the respective branch are more heavily weighted during training, yielding diverse sub-ensembles (FIG. 11). This process can proceed recursively until the depth limit is reached. This approach can identify clear connections between CART and gradient boosting—as the re-weighting ratio is varied, tree-structured boosting produces a spectrum of models with accuracy between CART and gradient boosting at the two extremes.

This concept of tree-structured boosting was previously discussed above. In this context, each of the weak learners could be a decision stump classifier, allowing the resulting tree-structured ensemble to be written explicitly as a decision tree by replacing each internal node with the attribute test of its corresponding decision stump. The resulting MediBoost decision tree was fully interpretable for its use in medical applications (since it was just a decision tree), but it retained the high performance of ensemble methods (since the decision tree was grown via boosting). Described further below is a general formulation of this idea of tree-structured boosting, focusing on its connections to CART and gradient boosting. For ease of analysis, there is a focus on weak learners that induce binary partitions of the instance space.

TSB can maintain a perfect binary tree of depth $n$, with $2^n - 1$ internal nodes, each of which corresponds to a weak learner. Each weak learner $h_k$ along the path from the root node to a leaf prediction node 1 induces two disjoint partitions of x, namely $P_k$ and $P_k^C = X \backslash P_k$ so that $h_k(x_i) \neq h_k(x_j) \forall x_i \in P_k$ and $x_j \in P_k^C$. Let $\{R_1, \ldots, R_n\}$ be the corresponding set of partitions along that path to 1, where each $R_k$ is either $P_k$ or $P_k^c$. We can then define the partition of x associated with 1 as $R_1 = \cap_{k=1}^n R_k$. TSB predicts a label for each $x \in R_l$ via the ensemble consisting of all weak learners along the path to 1 so that $F(x \in R_1) = \Sigma_{k=1}^n P_k h_k(x)$. To focus each branch of the tree on corresponding instances, thereby constructing diverse ensembles, TSB can maintain a set of weights $w \in \mathbb{R}^N$ over all training data. Let $w_{n,1}$ denote the weights associated with training a weak learner $h_n,1$ at the leaf node 1 at depth n.

In some embodiments, the tree is trained as follows. At each boosting step, there can be a current estimate of the function $F_{n-1}(x)$ corresponding to a perfect binary tree of height n−1. This estimate can be improved by replacing each of the $2^{n-1}$ leaf prediction nodes with additional weak learners $\{h'_{n,1}\}_{l=1}^{2^{n-1}}$ with corresponding weights $p_n \in \mathbb{R}^{2^{n-1}}$, growing the tree by one level. This yields a revised estimate of the function at each terminal node as $$F_n(x) = F_{n-1}(x) + \sum_{l=1}^{2^{n-1}} \rho_{n,l} \mathbb{1}[x \in \mathcal{R}_l] h'_{n,l}(x). \quad (1)$$

where 1[p] is a binary indicator function that is 1 if predicate p is true, and 0 otherwise. Since partitions $\{R_1, \ldots, R_{2^{n-1}}\}$ are disjoint, Equation (1) is equivalent to $2^{n-1}$ separate functions $$F_{n,l}(x \in \mathcal{R}_l) = F_{n-1,l}(x) + P_{n,l} h'_{n,1}(x),$$

one for each leaf's corresponding ensemble. The goal is to minimize the loss over the data $$L_n(X, y) = \sum_{l=1}^{2^{n-1}} \sum_{i=1}^{N} w_{n,l,i} \ell(y_i, F_{n-1,l}(x_i) + \rho_{n,l} \mathbb{1}[x_i \in \mathcal{R}_l] h'_{n,l}(x_i)), \quad (2)$$

by choosing $p_n$ and the $h'_{n,l}$'s at each leaf. Taking advantage again of the independence of the leaves, Equation (2) can be minimized by independently minimizing the inner summation for each 1, i.e., $$L_{n,l}(X, y) = \sum_{i=1}^{N} w_{n,l,i} \ell(y_i, F_{n-1}(x_i) + \rho_{n,l} h'_{n,l}(x_i)), \quad (3)$$

$$\forall l \in \{1, \ldots, 2^{n-1}\}.$$

Note that (3) can be solved efficiently via gradient boosting of each $L_{n,l}(\cdot)$ in a level-wise manner through the tree.

Next, there is a derivation of TSB where the weak learners are binary regression trees with least squares as the loss function $l(\cdot)$. The negative unconstrained gradient can be estimated at each data instance $$\left\{ \tilde{y}_i = -\frac{\partial \ell(y_i, F_{n-1}(x_i))}{\partial F_{n-1}(x_i)} \right\}_{i=1}^{N},$$

which are equivalent to the residuals (i.e., $\tilde{y}_i = y_i - F_{n-1}(x_i)$). Then, the optimal parameters can be determined for $L_{n,l}(\cdot)$ by solving $$\arg\min_{\rho_{n,l}, h'_{n,l}} \sum_{i=1}^{N} \omega_{n,l,i} (\tilde{y}_i - \rho_{n,l} h'_{n,l}(x_i))^2. \quad (4)$$

Gradient boosting can solve Equation (4) by first fitting $h'_{n,l}$ to the residuals $(X, -y)$, then solving for the optimal $p_{n,l}$. Adapting TSB to the classification setting,

| | |
|---|---|
| Algorithm 1 | TreeStructuredBoosting(X, y, w, λ, n, T, R, $F_{n-1}$) |
| Inputs: | training data (X, y) = $\{(x_i, y_i)\}_{i=1}^N$, instance weights w ∈ $\mathbb{R}^N \left(\text{default: } w_i = \frac{1}{N}\right)$, λ ∈ [0 + ∞], node depth n (default: 0), max height T, node domain $\mathcal{R}$ (default: X), prediction function $F_{n-1}(x)$ (default: $F_0(x) = \bar{y}$) |
| Outputs: | the root node of a hierarchical ensemble |

1: If n > T, return a prediction node $l_n$ that predicts the weighted average of y with weights w
2: Create a new subtree root $l_n$ to hold a weak learner
3: Compute negative gradients $\left\{ \tilde{y}_i = -\frac{\partial \ell(y_i, F_{n-1}(x_i))}{\partial F_{n-1}(x_i)} \right\}_{i=1}^{N}$
4: Fit weak classifier $h_n'(x): x \mapsto y$ by solving $h_n' \leftarrow \arg\min_{h, \beta} \Sigma_{i=1}^N w_i (\tilde{y}_i - \beta h(x_i))^2$
5: Let $\{P_n, P_n^c\}$ be the partitions induced by $h_n'$.
6: $\rho_{nl} \leftarrow \arg\min_\rho \Sigma_{i=1}^N w_i (y_i - F_{n-1}(x_i) - \rho h_{nl}'(x_i))^2$
7: Update the current function estimation $F_n(x) = F_{n-1}(x) + \rho h_n'(x)$
8: Update the left and right subtree instance weights, and normalize them:
   $w_i^{(left)} \propto w_i (\lambda + \mathbb{1}[x_i \in P_n]) \; w_i^{(right)} \propto w_i (\lambda + \mathbb{1}[x_i \in P_n^c])$
9: If $\mathcal{R} \cap P_n \neq \emptyset$, compute the left subtree recursively:
   $l_n \cdot \text{left} \leftarrow \text{TreeStructuredBoosting}(X, y, \lambda, w^{(left)}, \mathcal{R} \cap P_n, n + 1, T, F_n)$
10: If $\mathcal{R} \cap P_n^c \neq \emptyset$, compute the right subtree recursively:
    $l_n \cdot \text{right} \leftarrow \text{TreeStructuredBoosting}(X, y, \lambda, w^{(right)}, \mathcal{R} \cap P_n^c, n + 1, T, F_n)$ -continued 11: If $\mathcal{R} \cap P_n = \emptyset$, prune impossible left branch by returning $l_n \cdot$ right
Else If $\mathcal{R} \cap P_n^c = \emptyset$, prune impossible right branch by returning $l_n \cdot$ left
Else Return the subtree root $l_n$ for example using logistic regression base learners and negative binomial log-likelihood as the loss function $l(\cdot)$, follows directly from equation 4 by using the gradient boosting procedure for classification in place of regression.

If all instance weights w remain constant, this approach would build a perfect binary tree of height T, where each path from the root to a leaf represents the same ensemble, and so would be exactly equivalent to gradient boosting of (X, y). To focus each branch of the tree on corresponding instances, thereby constructing diverse ensembles, the weights can be updated separately for each of $h_{n,l}$'s two children: instances in the corresponding partition have their weight multiplied by a factor of $1+\lambda$ and instances outside the partition have their weights multiplied by a factor of $\lambda$, where $\lambda \in [0, \infty]$. The update rule for the weight $w_{n,l}(x_i)$ of $x_i$ for $R_{n,l} \in \{P_{n,l}, P^c_{n,l}\}$ (the two partitions induced by $h_{n,l}$) is given by $$w_{n,l}(x_i) = \frac{w_{n-1,l}(x_i)}{z_n}(\lambda + \mathbf{1}[x_i \in R_{n,l}])$$

where $z_n \in \mathbf{R}$ normalizes $w_{n,l}$ to be a distribution. The initial weights $w_0$ are typically uniform. The complete TSB approach is detailed as Algorithm 1, also incorporating pruning of any impossible branches where $\mathbf{R}_1 = \emptyset$.

4 Theoretical Analysis

This section analyzes TSB to show that it is equivalent to CART when $\lambda=0$ and equivalent to gradient boosting as $\lambda \to \infty$. Therefore, these theoretical results establish the intrinsic connections between CART and gradient boosting identified by TSB. Provided below are proof sketches for the four lemmas used to prove our main result in Theorem 1, below; full proofs of the lemmas are illustrated in FIGS. 14A-14D.

Lemma 1 The weight of $x_i$ at leaf $l \in \{1, \ldots, 2_n\}$ at the $n^{th}$ boosting iteration is given by $$w_{n,l}(x_i) = \frac{w_0(x_i)(\lambda+1)^{\sum_{k=1}^{n}\mathbf{1}[x_i \in R_k]}\lambda^{\sum_{k=1}^{n}\mathbf{1}[x_i \in R_k^c]}}{\prod_{k=1}^{n} z_k} \forall n = 1, 2, \ldots,$$

where $\{R_1 \ldots, R_n\}$ is the sequence of partitions along the path from the root to l. Proof Sketch: This lemma can be shown by induction based on Equation (5).

Lemma 2 Given the weight distribution formula (6) of $x_i$ at leaf $l \in \{1, \ldots, 2^n\}$ at the $n^{th}$ boosting iteration, the following limits hold, $$\lim_{\lambda \to 0} w_{n,l}(x_i) = \frac{w_0(x_i)}{\sum_{x_j \in \mathcal{R}_{n,l}} w_0(x_j)}\mathbf{1}[x_i \ni \mathcal{R}_{n,l}],$$

$$\lim_{\lambda \to \infty} w_{n,l}(x_i) = w_0(x_i).$$

where $R_n^l = \cap_{k=1}^{n} R_k$ is the intersection of the partitions along the path from the root to l. Proof Sketch: Both parts follow directly by taking the corresponding limits of Lemma 1.

Lemma 3 The optimal simple regressor $h'_{n,l}(X)$ that minimizes the loss function (3) at the $n^{th}$ iteration at node $l \in \{1, \ldots, 2_n\}$ is given by, $$h^*_{n,l}(x) = \begin{cases} \frac{\sum_{i:x_i \in R_n} w_{n,l}(x_i)(y_i - F_{n-1}(x_i))}{\sum_{i:x_i \in R_n} w_{n,l}(x_i)} & \text{if } x_i \in R_n \\ \frac{\sum_{i:x_i \in R_n^c} w_{n,l}(x_i)(y_i - F_{n-1}(x_i))}{\sum_{i:x_i \in R_n^c} w_{n,l}(x_i)} & \text{otherwise} \end{cases}$$

Proof Sketch: For a given region $R_n \sqsubset X$ at the $n^{th}$ boosting interaction, the simple regressor has the form $$h_n(x) = \begin{cases} h_{n_1} & \text{if } x \in R_n \\ h_{n_2} & \text{otherwise} \end{cases},$$

with constants $h_{n_1}, h_{n_2} \in \mathbf{R}$. We take the derivative of the loss function (3) in each of the two regions $R_n$ and $R^c_n$, and solve for where the derivative is equal to zero, obtaining (9).

Lemma 4 The TSB update rule is given by $F_n(X) = F_{n-1}(X) + h_{n,l}(X)$. If $h_{n,l}(X)$ is defined as $$h_{n,l}(x) = \frac{\sum_{i:x_i \in R_{n,l}} \omega_{n,l}(x_i)(y_i - F_{n-1}(x_i))}{\sum_{i:x_i \in R_{n,l}} \omega_{n,l}(x_i)}$$

with constant $F_0(x) = \bar{y}_0$, then $F_n(x) = \bar{y}_n$ is constant, with $$\bar{y}_n = \frac{\sum_{i:x_i \in R_{n,l}} \omega_{n,l}(x_i)y_i}{\sum_{i:x_i \in R_{n,l}} \omega_{n,l}(x_i)}, \forall n = 1, 2, \ldots.$$

Proof Sketch: The proof is by induction on n, building upon (10). It is shown that each $h_n(x_i)$ is constant and so $\bar{y}_n$ is constant, and therefore the lemma holds under the given update rule.

Building upon these four lemmas, the result is presented in the following theorem, and explained in the subsequent two remarks:

Theorem 1 Given the TSB optimal simple regressor (9) that minimizes the loss function (3), the following limits regarding the parameter $\lambda$ of the weight update rule (5) are enforced:

$$\lim_{\lambda \to 0} h^*_{n,l}(x) = \frac{\sum_{i:x_i \in R_{n,l}} w_0(x_i)y_i}{\sum_{i:x_i \in R_{n,l}} w_0(x_i)} - \bar{y}_{n-1},$$

-continued $$\lim_{\lambda \to \infty} h_{n,i}^*(x) = \begin{cases} \frac{\sum_{i:x_i \in R_n} \omega_0(x_i)(y_i - F_{n-1}(x_i))}{\sum_{i:x_i \in R_n} \omega_0(x_i)} & \text{if } x_i \in R_n \\ \frac{\sum_{i:x_i \in R_n^c} \omega_0(x_i)(y_i - F_{n-1}(x_i))}{\sum_{i:x_i \in R_n^c} \omega_0(x_i)} & \text{otherwise} \end{cases} \quad (13)$$

where $w_0(x_i)$ is the initial weight for the i-th training sample.

Proof The limit (12) follows from applying (7) from Lemma 2 to (9) from Lemma 3 regarding the result $F_n(x) = \bar{y}_n$ with $\bar{y}_n$ a constant defined by (11) in Lemma 4. Similarly, the limit (13) follows from applying (8) from Lemma 2 to (9) in Lemma 3.

Remark 1 The simple regressor given by (12) calculates a weighted average of the difference between the random output variables $y_i$ and the previous estimate $y_{n-1}$ of the function F*(x) in the disjoint regions defined by $R_{n,i}$. This formally defines the behavior of the CART algorithm.

Remark 2 The simple regressor given by (13) calculates a weighted average of the difference between the random output variables $y_i$ and the previous estimate of the function F*(x) given by the piece-wise constant function $F_{n-1}(x_i)$. $F_{n-1}(x_i)$ is defined in the overlapping region determined by the latest stump, namely $R_n$. This can formally define the behavior of the gradient boosting algorithm.

Based on Remark 1 and Remark 2, it can be concluded that TSB can equivalent to CART when λ→0 and gradient boosting as λ→∞. Besides identifying connections between these two algorithms, TSB can provide the flexibility to train a hybrid model that lies between CART and gradient boosting, with potentially improved performance over either, as shown empirically in the next section.

5 Experiments

In this section, the experimental validation of TSB is presented. In a first experiment, real world data is used to carry out a numerical evaluation of the classification error of TSB for different values of A. The behavior of the instance weights is then examined as A varies in a second experiment.

5.1 Assessment of TSB Model Performance Versus CART and Gradient Boosting

In this experiment, four life science data sets are used from the UCI repository: Breast Tissue, Indian Liver Patient Dataset (ILPD), SPECTF Heart Disease, and Wisconsin Breast Cancer. All these data sets contain numeric attributes with no missing values and are binary classification tasks. In this experiment, the classification error is measured as the value of λ increases from 0 to ∞. In particular, 10 equidistant error points corresponding to the in-sample and out-of-sample errors of the generated TSB trees are assessed, and the transient behavior of the classification errors as functions of λ are plotted. The goal is to illustrate the trajectory of the classification errors of TSB, which is expected to approximate the performance of CART as λ→0, and to converge asymptotically to gradient boosting as λ→∞.

To ensure fair comparison, the classification accuracy of CART and gradient boosting is assessed for different depth and learning rate values by performing 5-fold cross-validation. As a result, it is concluded that a tree/ensemble depth of 10 offered near-optimal accuracy, and so use it for all algorithms. The binary classification was carried out using the negative binomial log-likelihood as the loss function, similar to the LogitBoost approach, which requires an additional learning rate (shrinkage) factor, yet under the scheme described by Algorithm 1. The learning rate values are provided in the third column of Table 1.

TABLE 1

Data Set Specifications

| Data Set | # Instances | # Attributes | TSB Learning Rate |
|---|---|---|---|
| Breast Tissue | 106 | 9 | 0.3 |
| ILPD | 583 | 9 | 0.3 |
| SPECTF | 80 | 44 | 0.3 |
| Wisconsin Breast | 569 | 30 | 0.7 |
| Synthetic | 100 | 0 | 0.1 |

For each data set, the experimental results were averaged over 20 trials of 10-fold cross-validation over the data, using 90% of the samples for training and the remaining 10% for testing in each experiment. The error bars in the plots denote the standard error at each sample point.

Figure 12:
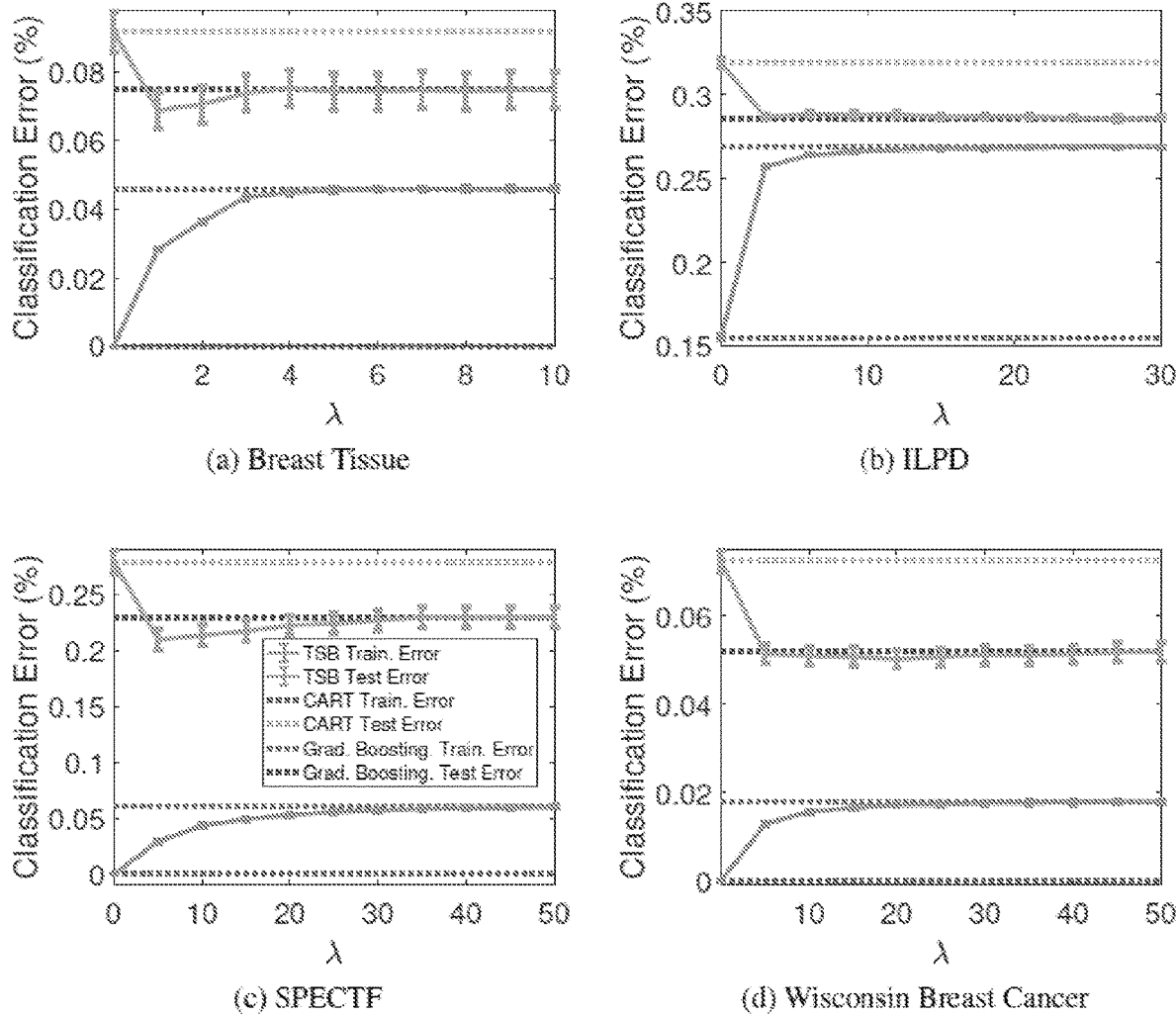
FIG. 12 illustrates in-sample and out-of-sample classification errors for different values of A, according to at least one embodiment of the invention.

The results are presented in FIG. 12, showing that the in-sample and out-of-sample classification errors for different values of λ of TSB approximates the CART and gradient boosting errors in the limits λ→0 and λ→∞ respectively. As expected, increasing lambda generally reduces overfitting. However, note that for each data set except ILPD, the lowest test error is achieved by a TSB model between the extremes of CART and gradient boosting. This reveals that hybrid TSB models can outperform either of CART or gradient boosting alone.

5.2 Effect of λ on the Instance Weights

Figure 13:
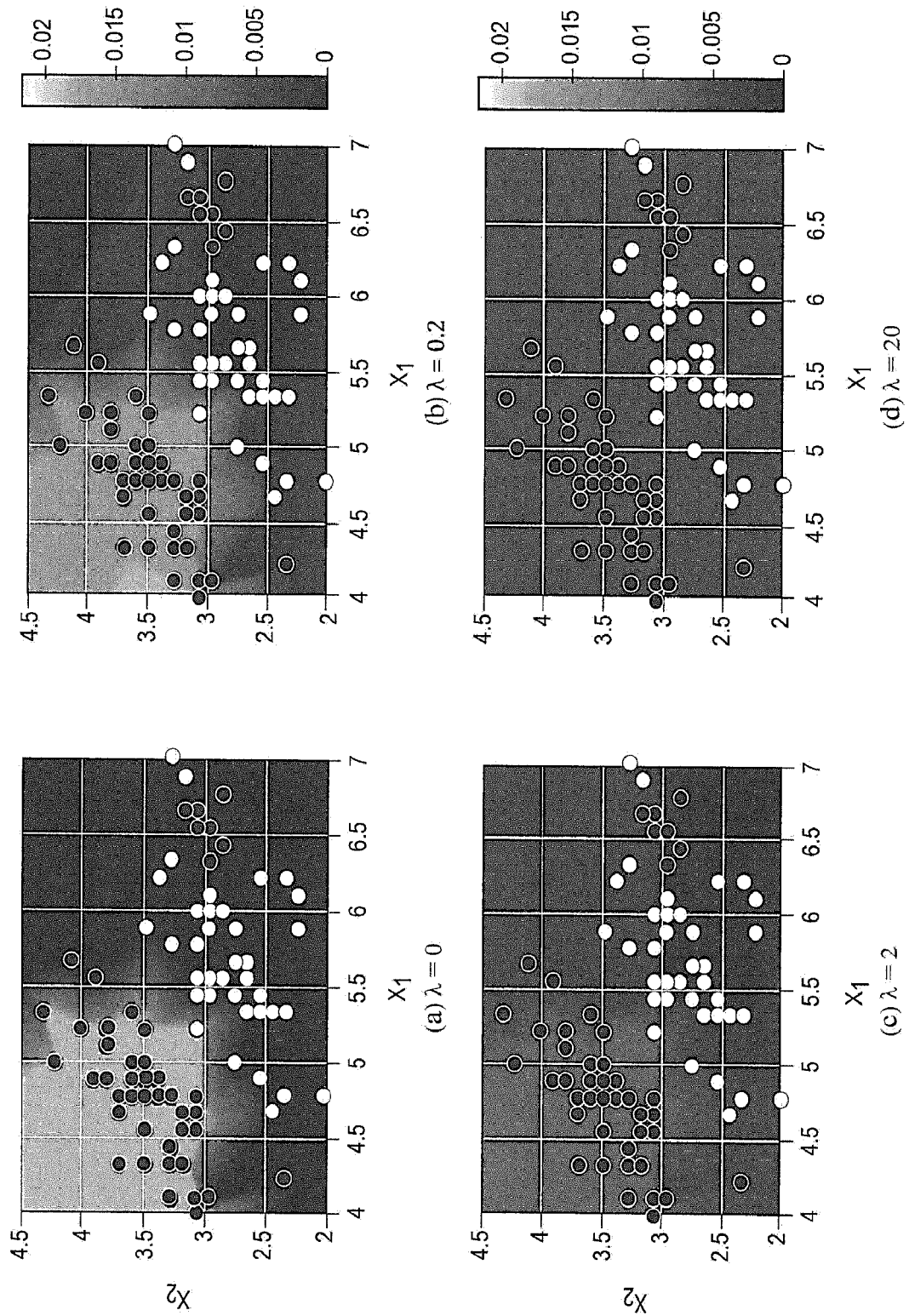
FIG. 13 illustrates a heatmap linearly interpolating the weights associated with each instance for a disjoint region defined by one of the four leaf nodes of the trained tree, according to at least one embodiment of the invention.

In a second experiment, a synthetic binary-labeled data set is used to graphically illustrate the behavior of the instance weights as functions of lambda. The synthetic data set consists of 100 points in R2, out of which 58 belong to the red class, and the remaining 42 belong to the green class, as shown in FIG. 13. The learning rate was chosen to be 0.1 based on classification accuracy, as in the previous experiment. The instance weights produced by TSB at different values of A were recorded.

FIG. 13 shows a heatmap linearly interpolating the weights associated with each instance for a disjoint region defined by one of the four leaf nodes of the trained tree. The chosen leaf node corresponds to the logical function (X2>2.95)∧(X1<5.55).

When A=0, the weights have binary normalized values that produce a sharp differentiation of the surface defined by the leaf node, similar to the behavior of CART, as illustrated in FIG. 13(a). As A increases in value, the weights become more diffuse in FIGS. 13(b) and 13(c), until A becomes significantly greater than 1. At that point, the weights approximate the initial values as anticipated by theory. Consequently, the ensembles along each path to a leaf are trained using equivalent instance weights, and therefore are the same and equivalent to gradient boosting.

6 Conclusions

As described above, it was shown that tree-structured boosting reveals the intrinsic connections between additive models (gradient boosting) and full interaction models (CART). As the parameter A varies from 0 to ∞, the models produced by TSB vary between CART and gradient boosting, respectively. This has been shown both theoretically and empirically. Notably, the experiments revealed that a hybrid model between these two extremes of CART and gradient boosting can outperform either of these alone.

It will be appreciated by those skilled in the art that changes could be made to the exemplary embodiments shown and described above without departing from the broad inventive concept thereof. It is understood, therefore, that this invention is not limited to the exemplary embodiments shown and described, but it is intended to cover modifications within the spirit and scope of the present invention as defined by the claims. For example, specific features of the exemplary embodiments may or may not be part of the claimed invention and features of the disclosed embodiments may be combined. Unless specifically set forth herein, the terms "a", "an" and "the" are not limited to one element but instead should be read as meaning "at least one".

It is to be understood that at least some of the figures and descriptions of the invention have been simplified to focus on elements that are relevant for a clear understanding of the invention, while eliminating, for purposes of clarity, other elements that those of ordinary skill in the art will appreciate may also comprise a portion of the invention. However, because such elements are well known in the art, and because they do not necessarily facilitate a better understanding of the invention, a description of such elements is not provided herein.

Further, to the extent that the method does not rely on the particular order of steps set forth herein, the particular order of the steps should not be construed as limitation on the claims. The claims directed to the method of the present invention should not be limited to the performance of their steps in the order written, and one skilled in the art can readily appreciate that the steps may be varied and still remain within the spirit and scope of the present invention.

What is claimed is:

1. A method for generating a decision tree having a plurality of nodes, arranged hierarchically as parent nodes and child nodes, comprising:
   during a training phase for building the decision tree, generating nodes of the decision tree including:
   (a) receiving i) training data including data instances, each data instance having a plurality of attributes and a corresponding label, ii) instance weightings, iii) a valid domain for each attribute generated, and iv) an accumulated weighted sum of predictions for a branch of the decision tree, thereby training different branches of the decision tree with disjoint subsets of the training data;
   (b) foregoing generating a node having a sibling node with an identical prediction;
   (c) associating one of a plurality of binary prediction of an attribute with each node including selecting the one of the plurality of binary predictions having a least amount of weighted error for the valid domain, the weighted error being based on the instance weightings and the accumulated weighted sum of predictions for the branch of the decision tree associated with the node;
   (d) in accordance with a determination that the node includes child nodes, repeat the generating the node step for the child nodes; and
   (e) in accordance with a determination that the node is a terminal node, associating the terminal node with an outcome classifier,
   wherein steps (a), (b), (c), (d) and (e) train the branch of the decision tree; and
   displaying the decision tree including the plurality of nodes arranged hierarchically.

2. The method of claim 1, wherein generating the node includes:
   foregoing generating the node having a binary prediction that is inconsistent with a parent node.

3. The method of claim 1, wherein generating the node includes:
   updating instance weightings for child nodes including incorporating an acceleration term to reduce consideration for data instances having labels that are inconsistent with the tree branch and utilizing the instance weightings during the generating the node step repeated for the child nodes.

4. The method of claim 1, wherein generating the node includes:
   updating the valid domain and utilizing the valid domain during generation of the child nodes.

5. A system for generating a decision tree having a plurality of nodes, arranged hierarchically as parent nodes and child nodes, comprising:
   one or more memory units each operable to store at least one program; and
   at least one processor communicatively coupled to the one or more memory units, in which the at least one program, when executed by the at least one processor, causes the at least one processor to perform the steps of claim 1.

6. A non-transitory computer readable storage medium having stored thereon computer-executable instructions which, when executed by a processor, perform the steps of claim 1.

* * * * *